United States Patent
Agarwal et al.

(10) Patent No.: US 12,367,753 B1
(45) Date of Patent: Jul. 22, 2025

(54) ANOMALOUS CONTENT MARKING AND DETERMINATION

(71) Applicant: Amazon Technologies, Inc., Seattle, WA (US)

(72) Inventors: Nikunj Agarwal, Auburn, WA (US); Sheshagiri Rao, San Diego, CA (US); Karim A B Yafi, Reston, VA (US); Paul Edward Landry, Burlington (CA); Brent Eric Wood, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 57 days.

(21) Appl. No.: 18/465,843

(22) Filed: Sep. 12, 2023

(51) Int. Cl.
*G08B 21/18* (2006.01)
*G09B 5/02* (2006.01)

(52) U.S. Cl.
CPC ............. *G08B 21/182* (2013.01); *G09B 5/02* (2013.01)

(58) Field of Classification Search
CPC .................................................. G08B 21/182
See application file for complete search history.

(56) References Cited

U.S. PATENT DOCUMENTS

| | | | | |
|---|---|---|---|---|
| 7,797,186 | B2* | 9/2010 | Dybus | G06Q 30/0254 709/224 |
| 2019/0260987 | A1* | 8/2019 | Amini | H04W 72/23 |
| 2020/0303063 | A1* | 9/2020 | Sharma | G16H 40/67 |

* cited by examiner

*Primary Examiner* — Travis R Hunnings
(74) *Attorney, Agent, or Firm* — Kilpatrick Townsend & Stockton LLP

(57) ABSTRACT

Described herein is a computer-implemented method for techniques relating to anomalous content marking and determination. A content marking request of anomalous content can be received by a computer system. A content marking count associated with the content can be determined for the content. A content marking ratio can be determined based on the content marking count. A parameter indicative of the anomalous status of the content can be determined based on the content marking count and/or content marking ratio, and the parameter can be compared to a threshold parameter. Alerts of anomalous content can be delivered at the user device based on the content marking count, the content marking ratio, the parameter or the comparison result between the parameter and the threshold parameter.

20 Claims, 10 Drawing Sheets

ANOMALOUS CONTENT MARKING AND DETERMINATION

BACKGROUND

Learning content such as training videos, learning modules, and other such learning content may be provided by a learning management system. Such a system may include a network-connected content database and the ability for users to search and view content stored in the database. In certain areas of learning, development of the subject matter may outpace creation of the learning content. This may result in outdated or otherwise irrelevant learning content being presented to users, leading to lead to user frustration, inefficient use of computer storage, and other issues.

BRIEF DESCRIPTION OF THE DRAWINGS

Various examples in accordance with the present disclosure will be described with reference to the drawings, in which.

DETAILED DESCRIPTION

Figure 1:
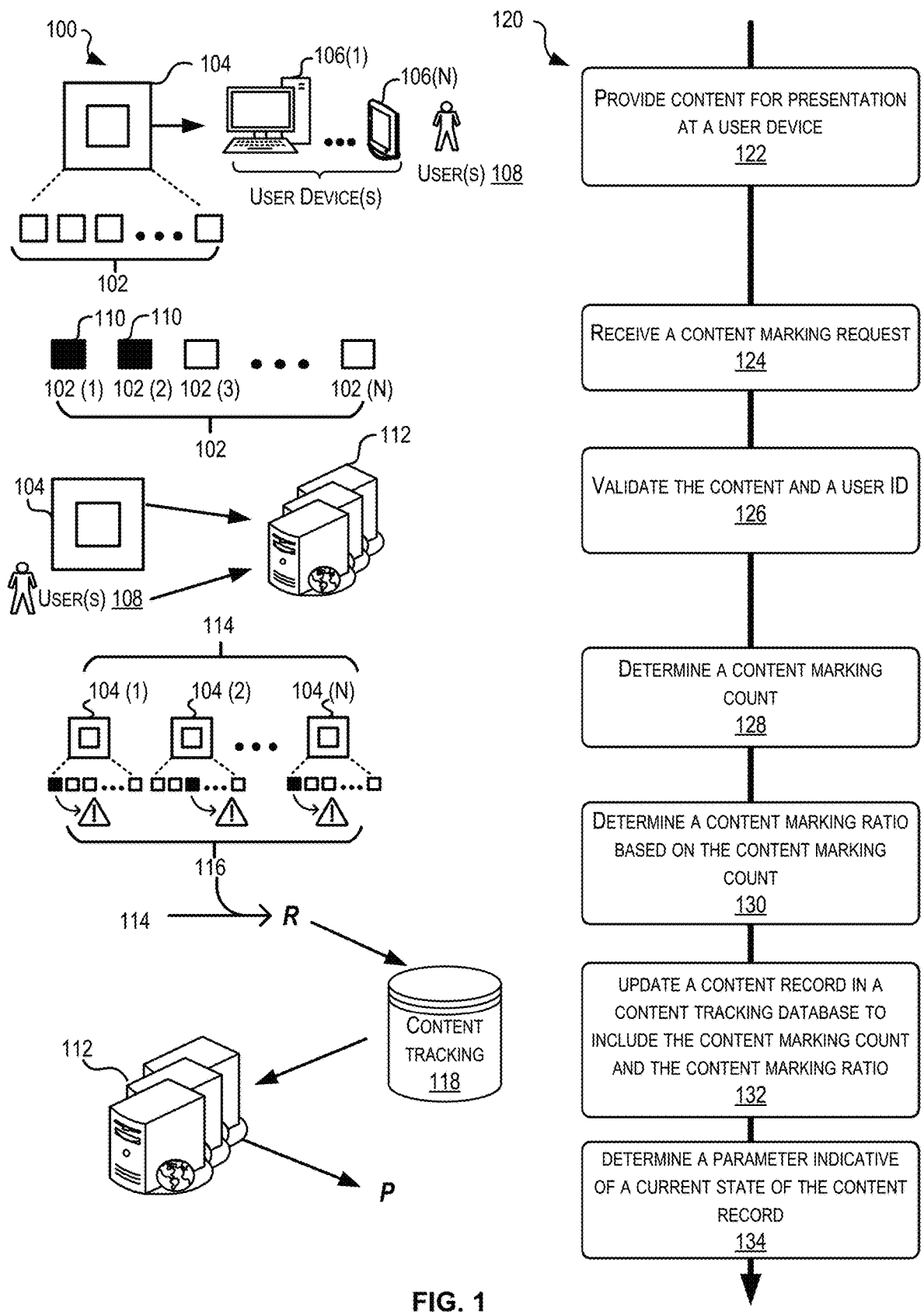
FIG. 1 illustrates an example block diagram and associated flowchart showing a process for implementing techniques relating to anomalous content marking and determination, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples described herein are directed to, among other things, systems, devices, computer-readable media, and techniques for effectively identifying or otherwise marking outdated, irrelevant, or otherwise inappropriate portions (referred to herein as "anomalous") of content and providing alerts regarding the same. Techniques described herein may provide a system for content users to mark or otherwise flag anomalous content. For example, a user interface used for viewing a learning module may be modified to include a button or other user interface element that a user may select when they view anomalous content in the learning module. A record associated with the learning module may be updated with an indication of the anomalous content. Similar indications can be collected, summed, and otherwise evaluated over time to determine next actions. For example, the system may present alerts about the anomalous content to administrators, put notices on the content to inform users about its anomalous nature, send instructions to databases (e.g., at content delivery networks) to archive or otherwise delete the content, and perform other actions as described herein.

In a particular example, a computing device, such as a webserver, can receive a content marking request that identifies a portion of a learning content. A user may use a user device to interact with the computing device to make the content marking request, which may be responsive to the user viewing learning content and determining that the portion of the content is anomalous. The content marking request may include a user identifier that identifies the user and/or a user device of the user and a content identifier that identifies the learning content. The content marking request may also indicate that the portion of the learning content is anomalous. The computing device can determine a content marking count based on the content marking request and other content marking requests that include the content identifier. For example, the computing device may collect other content marking requests from other users that view or otherwise interact with the same learning content. With the content marking count, the computing device can determine a content marking ratio, which may represent a number of marking requests received versus a number of views for the learning content. The computing device can update a content record in a content tracking file to include the content marking count and the content marking ratio, as associated with the learning content. When the content marking count, the content marking ratio, or some other parameter that corresponds to the scope and/or scale of the anomalous content exceeds one or more thresholds, the computing device can perform certain actions. This may include, for example, putting a notice on the learning content, automatically removing portions of anomalous content, archiving the learning content, sending notifications to administrators and/or other authorized users, updating the learning content (e.g., replacing anomalous content with correct information), and performing other similar functions.

Currently, conventional learning management systems tend to have disadvantages of inefficient use of computing resources and bandwidth. For example, conventional learning management systems, especially those that are deployed across large geographical areas, may store large quantities of outdated or otherwise anomalous content in geographically-distributed storage nodes such as are commonly used in content delivery networks. Continuously hosting and retaining anomalous content may result in expensive and wasteful use of storage space. Particularly, such expensive and wasteful use of storage space is accumulated for a large network with distributed content storage and significantly reduces the computing capacity of the large network. In addition, as conventional learning management systems do not automatically alert or timely remove anomalous content, users spend extra time going through outdated, irrelevant learning modules, which causes inefficient use of computing resources and bandwidth. Moreover, conventional learning management systems or previous approaches for marking content did not include streamlined user interfaces, and thus required more user clicks, page throughs, refreshes, email traffic, or other less efficient approaches for flagging content, which also causes inefficient use of computing resources and bandwidth. Finally, as conventional learning management systems usually require administrators to review and manually flag and/or remove the anomalous content, conventional learning management systems thus require additional human involvement and higher maintenance expenses.

The anomalous content marking and determination features described herein provide for a number of technological improvements to address the shortcomings described herein. For example, the anomalous content marking and determination features address the problem of wasteful and expensive storage of anomalous content by providing a mechanism to easily, and in an automated manner, archive anomalous content. This may be performed using a parameter that is generated based on content marking requests, which represent feedback about the content. The parameter can be easily shared with nodes of a content delivery network to cause the nodes to archive the content. The features described herein also collect content marking requests from users and/or user devices while those users view or interact with a learning content. Thus, rather than creating a dedicated process that would require additional bandwidth, computing resources, and human effort, the features described herein are performed as part of one streamlined workflow. The user interfaces by which content marking requests are received may be specifically adapted for users to provide feedback on content at different levels of granularity. Because the user interfaces for providing feedback are built into content viewing user interfaces as part of the same process, content marking requests can be received with fewer clicks, page refreshes, page throughs, and the like.

In practice, the features described herein may accumulate a content marking count based on feedback requests from different users. With the content marking count, to indicate the anomalous status of the content, the anomalous content marking and determination features can determine a content marking ratio representing a number of marking requests received versus a number of views for the learning content. To continuously track the anomalous status of the content, the content marking and determination features can update a content record in a content tracking file to include the content marking count and the content marking ratio. When the content marking count, the content marking ratio, or some other parameter that corresponds to the status (e.g., the scope and/or scale) of the anomalous content meets a criterion (e.g., exceeding one or more thresholds), the anomalous content marking and determination features can perform actions indicating the existence of the anomalous status. Example actions include putting a notice (e.g., as a graphical symbol) accompanying the learning content, automatically removing portions of anomalous content, archiving the learning content, sending notifications to administrators and/or other authorized users, updating the learning content (e.g., replacing anomalous content with correct information), and performing other similar functions, thereby reducing wasteful use of storage space, redundant clicks, internet traffic, etc.

Turning now to the figures, FIG. 1 illustrates an example block diagram and associated flowchart showing a process for implementing techniques relating to anomalous content marking and determination, according to at least one example. The diagram 100 depicts devices, objects, and the like that correspond to the process 120. The process 120 can be performed by any suitable combination of hardware and/or software, as described herein.

FIGS. 1 and 7-9 illustrate example flow diagrams showing respective processes 100, 700, 800, and 900, as described herein. The processes 100, 700, 800, and 900 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

The process 120 may begin at block 122 by the computer system 210 providing content 104 for presentation at a user device (e.g., one of user devices 106(1)-106(N)) associated with a user 108. The content 104 may be associated with a content identifier. The content 104 may include video, audio, pictorial illustration, text, or other suitable type of file capable of communicating information, facts, or data. In some examples, the content may include two or more different types of content that are associated. For example, a video file may be associated with a corresponding transcript. In some examples, playable content may also be defined by a plurality of timestamps corresponding to different parts or portions of the content and the like.

The content 104 may include a plurality of content portions 102. The content portion 102 may be a component of the content 104. In some examples, the content portion may include video, image, sound, transcript accompanying a video, text, pictorial illustrations, etc. The content portion 102 may further be divided into a subset of content portions 102(1)-102(N). The subset of content portions 102(1)-102(N) may be characterized by any factor as needed. For example, the content 104 may be a video and the subset of content portions 102(1)-102(N) may be characterized by their durations or lengths, which may each form a part of the video. Each of the subset of content portions 102(1)-102(N) may have different lengths (e.g., from one or two seconds of length to the duration of the content portion 102). In some examples, the subset of content portions 102(1)-102(N) may be characterized by file size. The file size of each subset of content portions 102(1)-102(N) may be configurable to a desired size and need not be equal-sized. In some examples, the content 104 may have different versions. The content 104 may be stored in a content database (e.g., content library 234A in FIG. 2). The content database may be stored in one or more geographically distributed content delivery servers.

The user device 106 (e.g., 106(1)-106(N)) may be operable by one or more users 108 to interact with the computer system 112. The users 108 may be content administrators, learners, or others that desire to interact, view, or use the content marking techniques described herein. The user device 106 may be any suitable type of computing device such as, but not limited to, a wearable device, a tablet, a mobile phone, a smart phone, a network-enabled streaming device (a high-definition multimedia interface ("HDMI") micro-console pluggable device), a personal digital assistant ("PDA"), a laptop computer, a desktop computer, a thin-client device, a tablet computer, a high-definition television, a web-enabled high-definition television, a set-top box, etc. For example, the user device 106(1) is illustrated as a desktop computer, while the user device 106(N) is illustrated as an example of a handheld mobile device. In some examples, the user device 106 may be a portable device compatible with image recognition technologies that determine relevant information related to objects it identifies using visual analysis based on a neural network.

The process 120 may continue at block 124 by the computer system 112 receiving a content marking request 110 from the user device 106. The content marking request 110 may be received by the computer system 112 via a user interface or graphical user interface. The marking request 110 may be received via one or more mechanisms. For example, the computer system 112 may receive the marking request 110 as a voice input that contains one or more words. In another examples, the computer system 112 may receive a click (or tap) via a graphical user interface (e.g., a button) on the user device 106. The click (or tap) indicates that the user marks the content 104 or any content portion 102 of the content through a screen of the user device 106 (e.g., to mark the content as anomalous). In some examples, the user interface or graphical user interface may include a graphical control element such as a progress bar. The control element may be correlated with the content 104 by the plurality of timestamps. In some examples, the control element may be accompanied by a textual representation of the progress in a percent format. The control element may receive various controls allowing the users 108 to selectively marking the content 104 and any subset of content portions 102(1)-102(N) as desired. For example, the control element may be a draggable progress bar and users 108 may drag a portion of the progress bar to selectively mark the content portion 102 that contains anomalous information. In some examples, the computer system 112 may also receive multiple words via keyboard input of the user device 106 as additional explanations or descriptions (e.g., "the marked content contains data X that is erroneous and the correct data should be Y") associated with the marking request 110. Any suitable input mechanism may be used to perform embodiments of the present disclosure. In some examples, the content 104 may include multiple versions and the marking request 110 may be directed to and associated with one of the multiple versions. In some examples, the marking request 110 may be generated by a computer system (e.g., the computer system 112), which may be configured to implement an algorithm (e.g., a machine learning model). For example, the content 104 may be loaded into a machine learning model that has been trained to identify anomalous content. Output from the machine learning model may include a probability that the input content is anomalous. In some examples, this may include classifying the content not only as anomalous or not anomalous, but also into one of a plurality of types of anomalous (e.g., outdated, incorrect, offensive, illegal, etc.). The computer system that operates the machine learning model may generate the content marking request 110 based on output from the machine learning model. The computer system may send, provide, or otherwise process the content marking request 110, as described in block 802 in FIG. 8 below. In some examples, the computer system 112 may be the computer system that operates the machine learning model. In some examples, the computer system 112 may receive additional information related to the marking request 110. The additional information may specify a reference source that verifies the anomaly of the content 104.

The process 120 may continue at block 126 by the computer system 112 validating the content 104 and the user identifier associated with the user 108. The user identifier may be a unique identifier or value that is associated with a user. The user identifier may be expressed as a string of text including alphabetic letters and numbers. The content 104 may be associated with a content identifier that is unique to the content 104. In some examples, the user identifier and/or the content identifier may be stored in an ID database (e.g., the ID library 234B in FIG. 2). The ID database may be stored in one or more geographically distributed content delivery servers. The validation process may include determining if the user associated with the user identifier is authorized to view or interact with the content associated with the content identifier. In the context of online learning, the validation process may determine, based on the user identifier and the content identifier, if the learning module has been assigned to the user.

The process 120 may continue at block 128 by the computer system 112 determining a content marking count 116. The content marking count 116 may be determined by summing the content marking request 110 with other content marking requests that include the content identifier. The content marking count 116 may be an aggregation or summation of the content marking request 110 received from the user devices 106. In some examples, the computer system 112 may add an increment of one to the content marking count 116 whenever the computer system 112 receives a content marking request 110 of the content 104. In some examples, as the content 104 may include content portions 102(1)-102(N) and more than one content marking requests 110 may be received for some of the content portions 102(1)-102(N) (e.g., content marking requests 110 are only received for content portion 102(1) and 102(2)), the computer system 112 may add an increment of two to the content marking count 116 accordingly. The value of increment to be added to the content marking count 116 may be adjusted as desired and is not required to be equal to the actual number of content marking requests 110 for the content 104. In some examples, prior to determining the content marking count 116, the computer system 112 may determine if the content 104 is present in a database directed to marking request collection. The database may be communicatively connected to the computer system 112. In some examples, the database may be stored in one or more geographically distributed content delivery servers.

The process 120 may continue at block 130 by the computer system 112 determining a content marking ratio (R) based on the content marking count 116. In some examples, the content marking ratio (R) may be calculated by dividing the content marking count 116 by a count of interactions 114 with the content 104. The count of interactions 114 may be an aggregation or summed value of interactions with the content 104. In some examples, the interactions with the content 104 may be the viewing of the content 104 via the user device 106. The computer system 112 may determine the count of interactions by tracking a number of play, views, and the like of the content 104 happen on the user device. In some examples, instead of receiving user input specifying a negative content status (e.g., a marking showing the content contains anomalous information or the content is irrelevant), the computer system 112 may allow users to provide a positive input specifying a positive content status of the content 104 (e.g., the content 104 is relevant). The computer system 112 may receive the positive input from any user interfaces or mechanisms as desired (e.g., a vote user interface feature, a click button, etc.).

The process 120 may continue at block 132 by the computer system 112 updating a content record in a content tracking file 118 to include the content marking count 116 and the content marking ratio (R). The content tracking file 118 may be readable and executable to the computer system 112. In some examples, the content tracking file 118 may be stored in the computer system 112 or the user device 106. In some examples, the content tracking file 118 may include a plurality of tables consists of columns and rows to store the content record, the content marking count 116, and the content marking ratio (R).

The process 120 may continue at block 134 by the computer system 112 determining a parameter (P) indicative of a current state of the content record. In some examples, the parameter may be determined based on the content marking count and/or the content marking ratio. In some examples, the parameter (P) could be a weighted average value based on the content marking count. The contributing weight of the content marking count 116 may be determined based on various relevant factors as well as the nature of the anomaly causing the content 104 to be marked. For example, the contributing weight of the content marking count 116 may be determined based on the classification (e.g., the subject topic of the content such as investment, art appreciation, language learning, etc.) of the content 104 and the content 104 being marked for containing outdated information (e.g., Mr. X is no longer the president of country A). When the content 104 is being marked for containing outdated information (e.g., Mr. X is no longer the president of country A), the contributing weight of the content marking count 116 for the content 104 having a classification of "investment" may be higher than the contributing weight of the content marking count 116 for the content 104 having a classification of "language learning." In some examples, the relevant factors of the content 104 may be stored as a metafile that is associated with the content 104 by the content identifier. In some examples, when the computer system 112 receives additional information specifying a reference source that verifies the anomaly of the content 104, the credibility of the reference source may contribute to the value of the parameter (P). For example, when the credibility of website X is lower than the credibility of book Y, the computer system 112 may assign a lower contributing weight for the content marking count specifying website X as the reference source than the content marking count specifying Book Y as the reference source. In some examples, the parameter (P) may be determined by using a machine learning model. In some examples, the computer system 112 may compare the parameter (P) to a threshold parameter to determine whether to deliver an alert of anomalous content to users 108. The threshold parameter may be a numerical value, a dynamic variable, and the like. In some examples, based on the parameter (P) and/or the comparison result, the computer system 112 may determine to remove, modify, or update the corresponding content in the content database. The content database may be stored in one or more geographically distributed content delivery servers. For example, the parameter may be sent to all nodes of a content delivery network that includes the content identified by the content identifier and the nodes (controller nodes) may include software and/or firmware that can use the parameter to perform functions on the nodes such as archiving the content identified by the content identifier, modifying the content identified by the content identifier, and/or performing other actions relating to the content.

Figure 2:
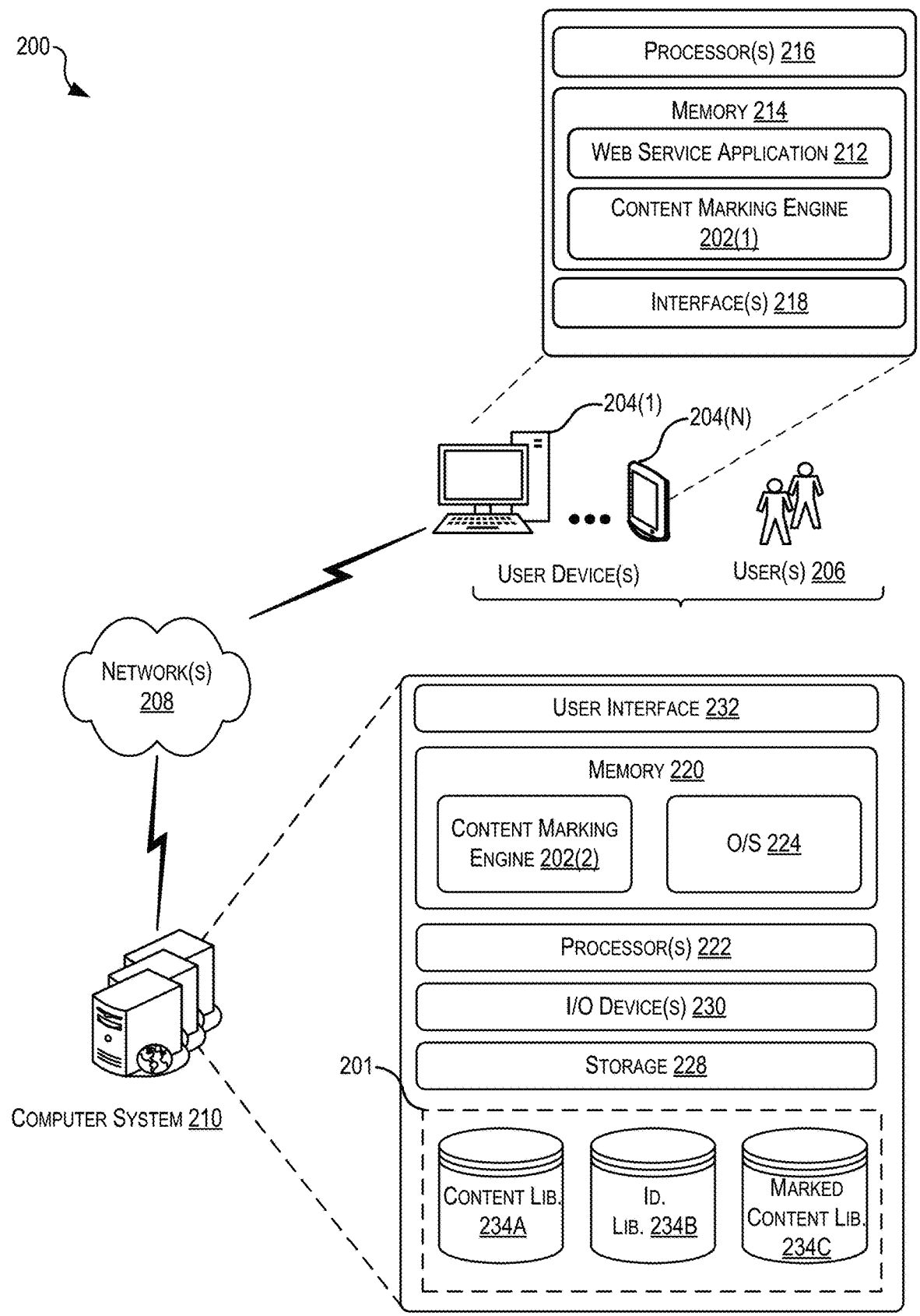
FIG. 2 illustrates an example schematic architecture for implementing techniques relating to anomalous content marking and determination, according to at least one example.

FIG. 2 illustrates an example schematic architecture for implementing techniques relating to anomalous content marking and determination, according to at least one example. The architecture 200 may include a computer system 210 (e.g., the computer system 112 described herein) in communication with one or more user devices 204(1)-204(N) (e.g., the user devices 106) via one or more networks 208 (hereinafter, "the network 208").

The user device 204 may include a memory 220 and processor(s) 216. In the memory 220 may be stored program instructions that are loadable and executable on the processor(s) 216, as well as data generated during the execution of these programs. Depending on the configuration and type of user device 204, the memory 220 may be volatile (such as random access memory ("RAM")) and/or non-volatile (such as read-only memory (ROM), flash memory, etc.).

In some examples, the memory 214 may include a web service application 212 and a version of the content marking engine 202 (e.g., 202(1)). The web service application 212 and/or the content marking engine 202(1) may allow the user 206 to interact with the computer system 210 via the network 208. The user device 204 may also include one or more interfaces 218 to enable communication with other devices, systems, and the like. The content marking engine 202, whether embodied in the user device 204 or the computer system 210, may be configured to perform the techniques described herein.

Turning now to the details of the computer system 210, the computer system 210 may include one or more computer system computers, perhaps arranged in a cluster of servers or as a server farm, and may host web service applications. The function of the computer system 210 may be implemented in a cloud-based environment such that individual components of the computer system 210 are virtual resources in a distributed environment. The computer system 210 also may be implemented as part of an online training platform at which users may interact with contents such as those described herein. For example, the online training platform may host users that add content to the platform and may itself host content.

The computer system 210 may include at least one memory 220 and one or more processing units (or processor(s)) 222. The processor 222 may be implemented as appropriate in hardware, computer-executable instructions, software, firmware, or combinations thereof. Computer-executable instruction, software, or firmware implementations of the processor 222 may include computer-executable or machine-executable instructions written in any suitable programming language to perform the various functions described. The memory 220 may include more than one memory and may be distributed throughout the computer system 210. The memory 220 may store program instructions that are loadable and executable on the processor(s) 222, as well as data generated during the execution of these programs. Depending on the configuration and type of memory including the computer system 210, the memory 220 may be volatile (such as RAM and/or non-volatile (such as read-only memory ("ROM"), flash memory, or other memory). The memory 220 may include an operating system 224 and one or more application programs, modules, or services for implementing the features disclosed herein including at least a version of the content marking engine 202 (e.g., 202(2)). For example, the content marking engine 202(2) may perform the functionality described herein.

The computer system 210 may also include additional storage 228, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 228, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 210 and/or part of the user device 204.

The computer system 210 may also include input/output (I/O) device(s) and/or ports 230, such as for enabling connection with a keyboard, a mouse, a pen, a voice input device, a touch input device, a display, speakers, a printer, or other I/O device.

In some examples, the computer system 210 may also include one or more user interface(s) 232. The user interface 232 may be utilized by an operator, curator, or other authorized user to access portions of the computer system 210. In some examples, the user interface 232 may include a graphical user interface, voice interfaces, web-based applications, programmatic interfaces such as APIs, or other user interface configurations.

The computer system 210 may also include a data store 201. In some examples, the data store 201 may include one or more databases, data structures, or the like for storing and/or retaining information associated with the computer system 210 and which, in some examples, may be accessible by the user devices 204. For example, the data store 201 may include the data libraries 234A, 234B, and 234C described herein. The content 104 (in FIG. 1) may be stored in a content library 234A. The user identifier and/or the content identifier may be stored in an ID library 234B. The content 104 having received content marking requests may be moved to and stored in a marked content library 234C. In some examples, content library 234A, the ID library 234B, and/or the marked content library 234C may be stored in one or more geographically distributed content delivery servers.

Figure 3:
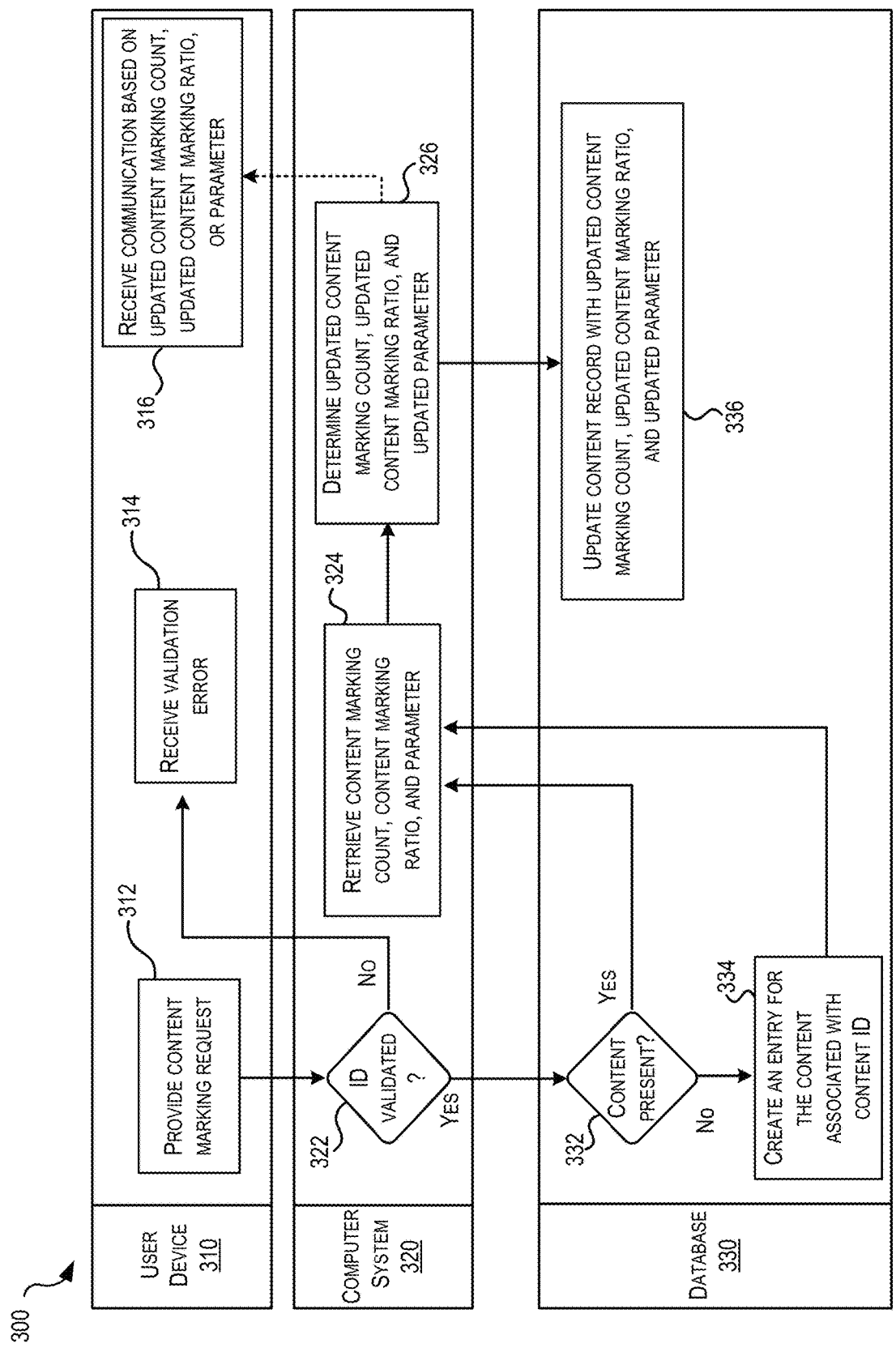
FIG. 3 illustrates a diagram relating to implementing techniques relating to anomalous content marking and determination, according to at least one example.

FIG. 3 illustrates a diagram relating to implementing techniques relating to anomalous content marking and determination, according to at least one example. In various implementations, some or all of process 300 or the operations shown may be performed by code executing on a general-purpose computing system (which may include one or more processors or one or more computing subsystems), by a hardware-only system, or by a system that is a hybrid of the two. The entities involved with the process 300 may include at least one user device 310 (e.g., user device 106 in FIG. 1, user device 204 in FIG. 2) associated with at least one user, computer system 320 (e.g., computer system 112 in FIG. 1 and computer system 210 in FIG. 2), and database 330 (e.g., marked content library 234C in FIG. 2). In various implementations, these entities may be, and may communicate with each other, as described with respect to FIG. 1, FIG. 2 and throughout this disclosure.

The process 300 may begin at 312 with the user device 310 providing content marking request of the content (e.g., content 104 in FIG. 1) indicating that at least a portion of the content is anomalous to the computer system 320 (e.g., computer system 112 in FIG. 1 and computer system 210 in FIG. 2). The marking request of the content may include a user identifier and the content identifier (of the content 104 in FIG. 1). In some examples, instead of the user device 310 as illustrated in FIG. 3, the marking request of the content may be generated by a computer system (e.g., the computer system 112), which may be configured to implement an algorithm (e.g., a machine learning model). For example, the content may be loaded into a machine learning model that has been trained to identify anomalous content. Output from the machine learning model may include a probability that the input content is anomalous. In some examples, this may include classifying the content not only as anomalous or not anomalous, but also into one of a plurality of types of anomalous (e.g., outdated, incorrect, offensive, illegal, etc.). The computer system that operates the machine learning model may generate the content marking request based on output from the machine learning model. The computer system may send, provide, or otherwise process the content marking request, as described in block 802 of FIG. 8 below. In some examples, the computer system may be the computer system that operates the machine learning model.

The content marking request may be received by the computer system 320 via a user interface or graphical user interface. The content marking request may also be received via one or more mechanisms. For example, the computer system 320 may receive the marking request as a voice input that contains one or more words. In other examples, the computer system 320 may receive a click (or tap) via a graphical user interface (e.g., a button) which indicates that the user marks the content or any content portion on a screen of the user device 310 (e.g., to mark the content as anomalous). In some examples, the user interface or graphical user interface may allow the user to highlight or select a target portion of the transcript accompanying a video content by using a graphical control element. In other examples, the user interface or graphical user interface may allow the user to pause the video content and add a marking request on the paused video to specifically identify the anomalous information. In some examples, the user interface or graphical user interface may receive a marking request in a multi-step manner. In an example two-step marking request, the user may first identify a part or portion (e.g., by selecting a portion of the transcript or a paused video) of the content containing anomalous information, and then finish the content marking request by an action that confirms the content marking request.

In some examples, the computer system 320 may also receive multiple words via keyboard input from the user device 310 as additional explanations or descriptions (e.g., "the marked content contains data X that is erroneous and the correct data should be Y") to the marking request. Any suitable input mechanism may be used to perform embodiments of the present disclosure. In some examples, the content may include multiple versions and the marking request may be directed to and associated with one of the multiple versions.

The process 300 may continue at 322 with the computer system 320 (e.g., computer system 112 in FIG. 1 and computer system 210 in FIG. 2) validating the user identifier and the content identifier (of the content 104 in FIG. 1) to determine if the user is authorized to view the content associated with the content identifier, thereby determining if the content marking request is authentic. In some examples, the validation process may include, based on the content identifier, determining if the associated content is present in a validation database. Additionally, the validation process may include, based on the user identifier, determining if the associated user is an authorized user (e.g., a registered user) to view and/or make a marking request of the corresponding content by determining if the associated content is present in the validation database. The user may also be validated via checking the presence and authenticity of credentials provided by the user in the validation database. In some examples, the content may be validated against a first database and the user may be validated against a second database.

If the computer system 320 determines that the user identifier or the content identifier is not validated, at 314, the user device 310 receives validation error from the computer system 320. If the computer system 320 determines that the user identifier or the content identifier is validated, and the user is accordingly authorized to view the content associated with the content identifier, the computer system 320 then determines, at 332, if the content (e.g., content 104 of FIG. 1) associated with the content identifier is present in a database 330. In some examples, the database 330 may be stored in one or more geographically distributed content delivery servers. If the computer system 320 determines that the content (e.g., content 104 of FIG. 1) associated with the content identifier is not present in the database 330, at 334, the computer system 320 creates a new entry for the content associated with the content identifier in the database 330. If the computer system 320 determines that content is present in the database 330, at 324, the computer system 320 retrieves a content marking count, a content marking ratio, and a parameter associated with the content (e.g., content 104 of FIG. 1). In some examples, the parameter may be determined based on the content marking count and/or the content marking ratio. In some examples, the parameter may be a weighted average value based on the content marking count. The contributing weight of the content marking count may be determined based on various relevant factors as well as the nature of the anomaly causing the content (e.g., content 104 in FIG. 1) to be marked.

At 326, the computer system 320 determines an updated content marking count, an updated content marking ratio, and an updated parameter associated with the content (e.g., content 104 of FIG. 1) based on the retrieved content marking count, the retrieved content marking ratio, the retrieved parameter and the content marking request received from the user device 310 associated with the content (e.g., content 104 of FIG. 1). In some examples, the computer system 320 may calculate the updated content marking ratio by dividing the updated content marking count by a count of total user interactions with the content. In some examples, at 316, the user device 310 may optionally receive communications (e.g., alerts) based on the updated content marking count, the updated content marking ratio, and the updated parameter. At 336, the computer system 320 updates a content record associated with the content with the updated content marking count, the updated content marking ratio, and the updated parameter determined at 326.

Figure 4:
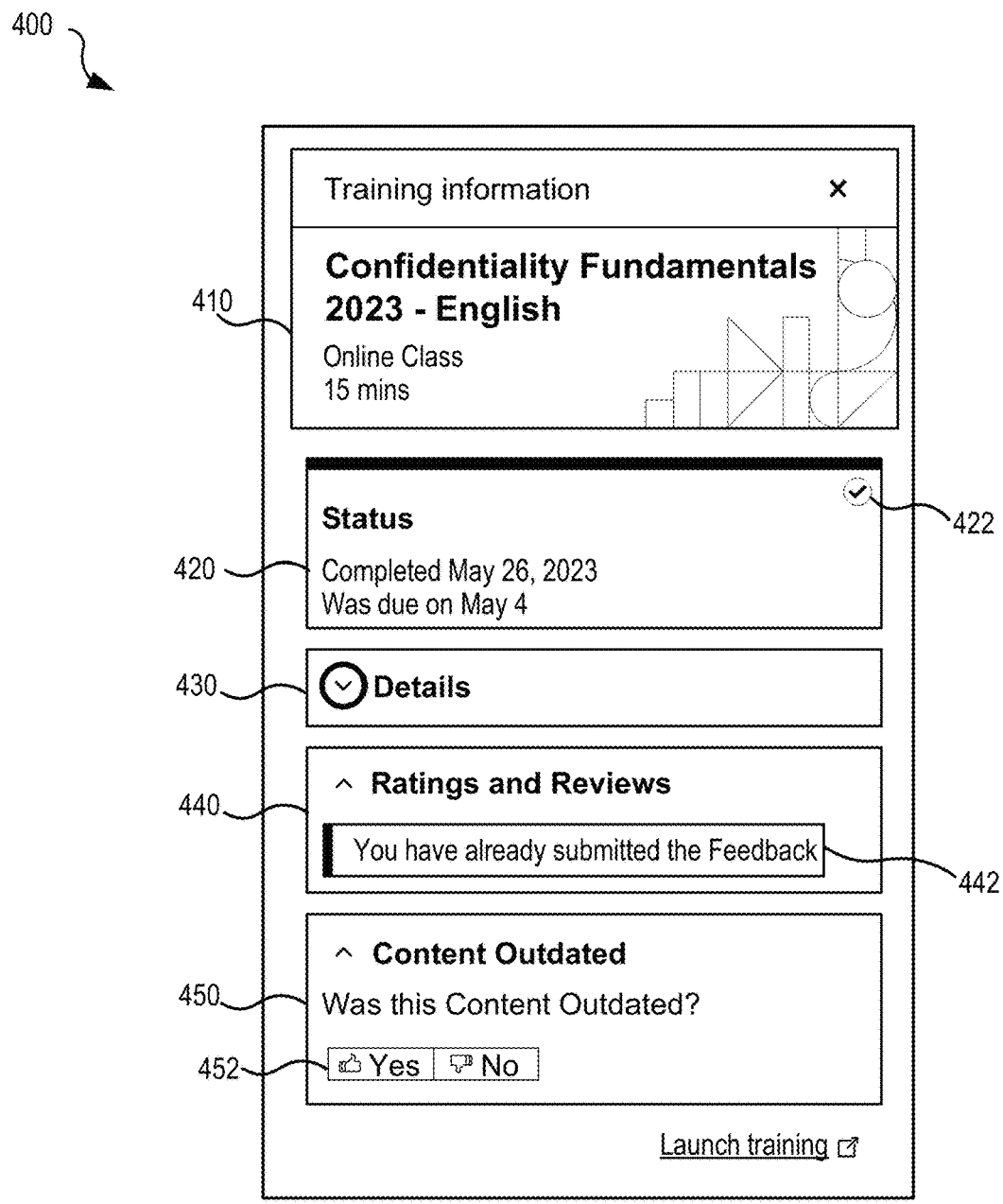
FIG. 4 is an example of a user interface for implementing techniques relating to anomalous content marking and determination, according to at least one example.

FIG. 4 is an example of a user interface for implementing techniques relating to anomalous content marking and determination, according to at least one example. The user interface 400 may be presented on a user device such as one of the user devices 204 (in FIG. 2) by communicating with the computer system 210, which is an example of a web server. The user interface 400 may represent a user interface that allows a user to interact with the computer system 112, 210, and 320 as illustrated in relation to FIG. 1, FIG. 2, and FIG. 3, respectively. The user interface 400 may include a content information section 410, a content status section 420, an additional information section 430, a user input section 440, and a content marking request section 450.

The content information section 410 displays general information about the content (e.g., content 104 in FIG. 1). Example general information may include, but is not limited to, a title of the content, length of the content, subject topic of the content, etc. The content status section 420 may display the user completion status of the content. In some examples, the completion status may be displayed by an indicating mark (e.g., a graphical symbol) 422. The additional information section 430 may include additional information (e.g., transcript, upload date of the content, etc.) that is not shown in the content information section 410. In some examples, the additional information section 430 may be a dropdown menu. The user input section 440 may include ratings and reviews provided by users. In some examples, the users may select a rating of the content from a rating scale displayed in the user input section 440. In some examples, the users may input descriptive reviews in the form of text via the keyboard of the user device. In some examples, as illustrated by icon 442, the user input section may indicate whether the user has already submitted a rating or review of the content.

The content marking request section 450 allows the user to indicate that the content or any content portion is anomalous. In some examples, the content marking request section 450 may use a button 452 to collect content marking request from the users. In some examples, in response to a user selection of the button 452, the computer system (e.g., 112, 210, and 320 as illustrated in FIG. 1, FIG. 2, and FIG. 3) may perform the process 120 or the process 300 as illustrated in FIG. 1 and FIG. 3. In some examples, in response to user selecting the button 452, the user device (e.g., 106(1)-106(N) and 204(1)-204(N) in FIG. 1 and FIG. 2) may push or display a confirmation notification on the user device to confirm that the marking request has been received. In some examples, in response to the user selection of the button 452, the button 452 may be highlighted, shaded, or changed in any appropriate mechanism to reflect the user selection. In some examples, in response to the user selection of the button 452, the user interface 400 may prompt a text box at the user device allowing users to input additional details related to the selection of the button 452. The user may choose to close the text box without providing additional details.

In some examples, after the user has selected the button 452, the user device may generate a marking request based on the user selection and transmit the marking request to the computer system. The computer system may accordingly aggregate or add one count to the content marking count for the content in response to receiving the marking request. In some examples, the content marking request section 450 may contain additional buttons (not shown) allowing users to mark different properties, status, and/or characteristics of the content. Example properties, status, and/or characteristics may include relevance, accuracy, content available in foreign languages, etc. The text string of the button 452 may be adjusted as desired.

Figure 5:
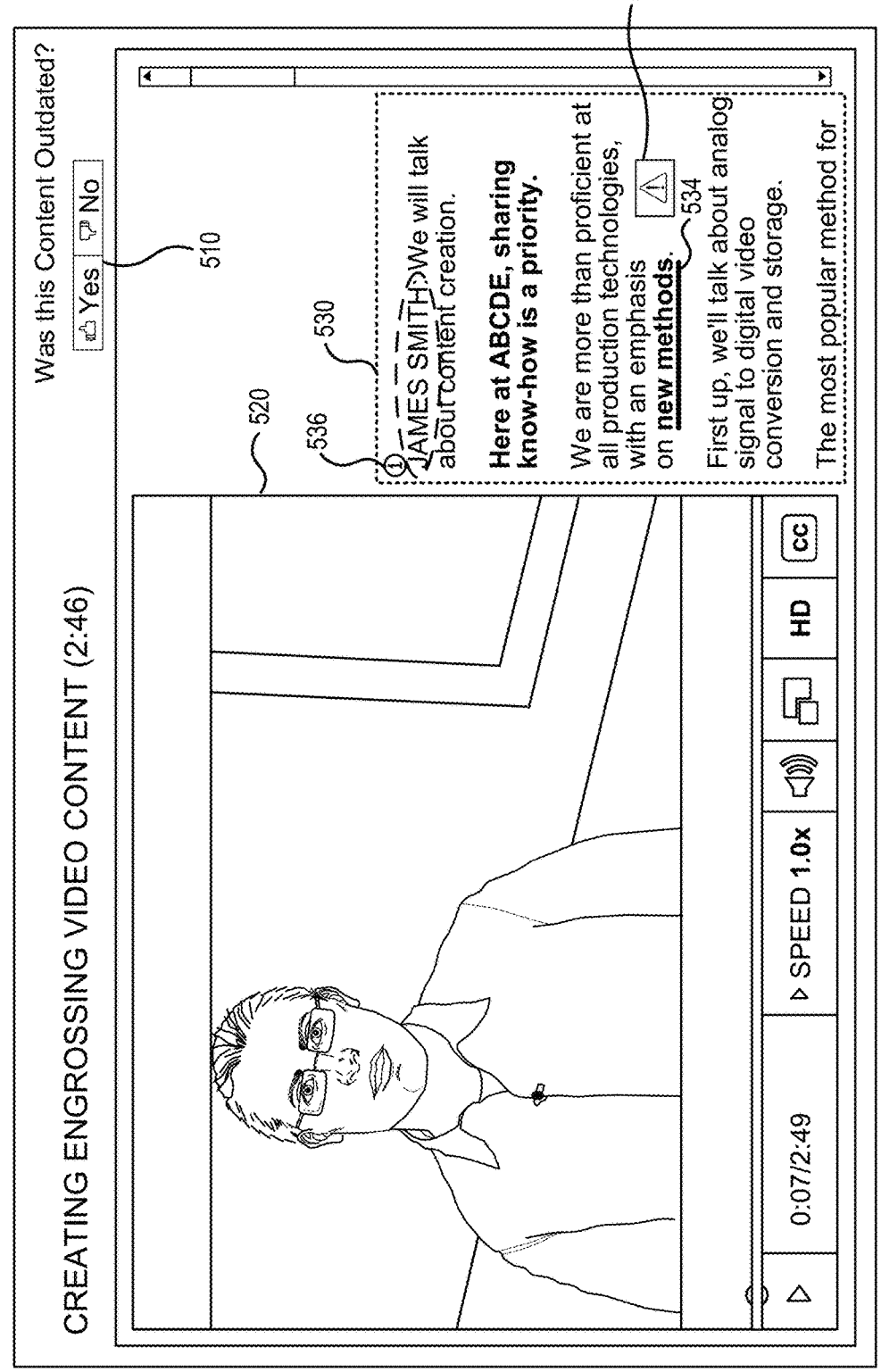
FIG. 5 is an example of a user interface for implementing techniques relating to anomalous content marking and determination, according to at least one example.

FIG. 5 is an example of a user interface for implementing techniques relating to anomalous content marking and determination, according to at least one example. The user interface 500 may be presented on a user device such as one of the user devices 204 (in FIG. 2) by communicating with the computer system 210 (in FIG. 2), which is an example of a web server. The user interface 500 may represent a user interface. The user interface 400 may include a content marking request section 510, a video section 520, and a transcript section 530. The content marking request section 510 allows the user to indicate that the content or any content portion is anomalous. In some examples, the content or content portion may be marked as "anomalous" for containing information, data, or fact that is erroneous, outdated, inaccurate, and/or otherwise requiring attention. The content portion may be a component of the content. In some examples, the content portion may include video, image, sound, transcript accompanying a video, text, pictorial illustrations, etc. By presenting content portions as different sections, the user interface 500 may allow users to specifically mark the content portion that contains anomalous information. For examples, the user interface 500 allows a user to pause the video content portion and the user may use an interactive element (e.g., a freeform drawing pencil) to mark out any anomalous content portion on the paused video. In some examples, the content marking request section 510 may be a button enabling the collection of content marking request from the users. The video section 520 may display the video or pictorial illustration of the content. The transcript section 530 may include a transcript of the content, and the transcript of the content may be correlated with the video based on a plurality of timestamps. Part of the transcript may be marked by highlighting and the user may click on the button 532 to specifically report the location of the anomalous information of the content. In some examples, to mark part of the transcript, the user may use a graphical control element (e.g., a pencil symbol, a highlighter symbol) to select a target content portion 534.

In some examples, the computer system may use a machine learning model to automatically identify anomalous content or content portion including outdated, erroneous, or inaccurate information based on previous user input, the content marking count, the content marking ratio, and/or the parameter as determined by the process 120 in FIG. 1 and the process 300 in FIG. 3. In some examples, the identification of the anomalous content or the anomalous content portion may cause the computer system to accordingly aggregate or add one count to the content marking count for the content. In some examples, the anomalous content or content portion may be identified based on other data or data sources as desired (e.g., the content or content portion may be verified against data provided by a credible third-party source). In some examples, the anomalous content or content portion identified by the machine learning model may be presented at the user device by prompting a warning symbol 536 that invites the user to review the potentially anomalous content or content portion. The warning symbol 536 may be displayed with highlighting or marking the potentially anomalous content or content portion that is identified by the machine learning model. In some examples, the user may interact with (e.g., click, tap) the warning symbol 536 first before the user interface 500 directs the user to the potentially anomalous content or content portion for review. In some examples, the user interface 500 may use interactive element (e.g., a button) to allow the user to confirm or deny the potentially anomalous content or content portion identified by the machine learning model. In response to receiving that the user has confirmed the potentially anomalous content or content portion identified by the machine learning model, the computer system may accordingly update the content marking count for the content (e.g., aggregating or adding one count to the content marking count). In some examples, besides displaying the potentially anomalous content or content portion, the user interface 500 may also display suggested correction of the anomalous content or content portion. For example, the machine learning model (or based on some other input or process) may identify that the name of the current U.S. president is outdated in some content. In this example, the machine learning model may suggest a correction to the outdated content in the form of replacement of the old president's name with the new president's. The user interface 500 may use an interactive element (e.g., a button) to accept or ignore the suggested correction. In response to receiving that the user has accepted the suggested correction, the computer system may accordingly update the content marking count for the content (e.g., aggregating or adding one count to the content marking count).

Figure 6:
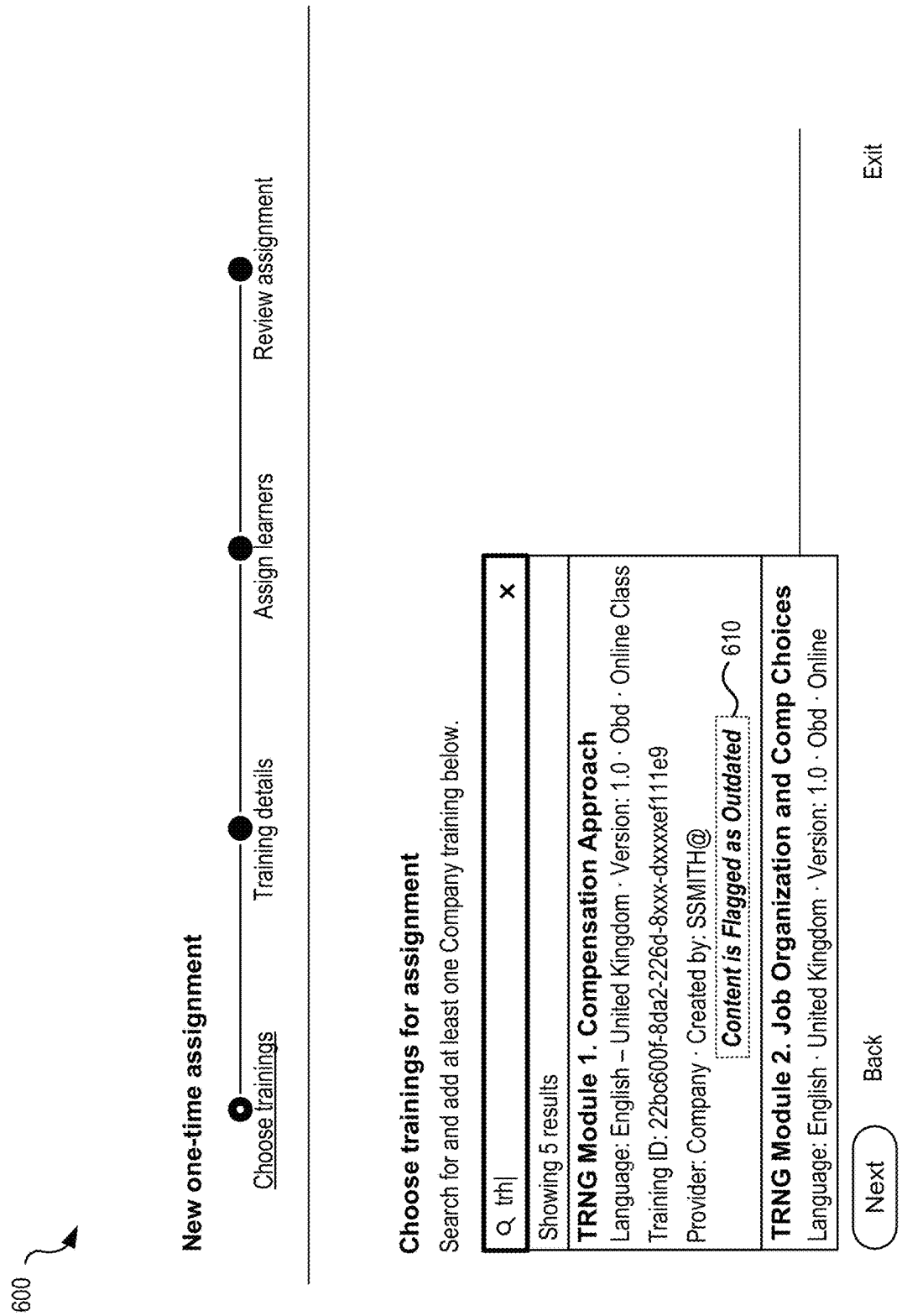
FIG. 6 is an example of a user interface for implementing techniques relating to anomalous content marking and determination, according to at least one example.

FIG. 6 is an example of a user interface for implementing techniques relating to anomalous content marking and determination, according to at least one example. The user interface 600 may be presented on a user device such as one of the user devices 204 (in FIG. 2) by communicating with the computer system 210 (in FIG. 2), which is an example of a web server. The user interface may present or display an alert 610 notifying a user that the content contains anomalous information. In some examples, the user interface 600 may present the alert 610 including a color indicator. The color indicator may further include a color code and the content identifier of the corresponding content. The color indicator, as well as the color code, may be determined based on the content marking ratio or the parameter determined by the computer system 112, 210, and 320 as illustrated in relation to FIG. 1, FIG. 2, and FIG. 3, respectively. In some examples, a first color code is assigned by the computer system to the content marking ratio or the parameter in a first value range, a second color code is assigned to the content marking ratio or the parameter in a second value range, and a third color code is assigned to the content marking ratio or the parameter in a third value range. In some examples, the computer system may assign yellow to the content having a content marking ratio in a range of 3-5%, 5-10%, 10-15%, 15-20%, 20-25%, 25-30%, 30-35%, 35-40%, 40-45%, or 45-50%. In some examples, the computer system may assign red to the content having a content marking ratio in a range of 50-55%, 55-60%, 60-65%, 65-70%, 70-75%, 75-80%, 80-85%, 85-90%, 90-95%, or 95-100%.

Figure 7:
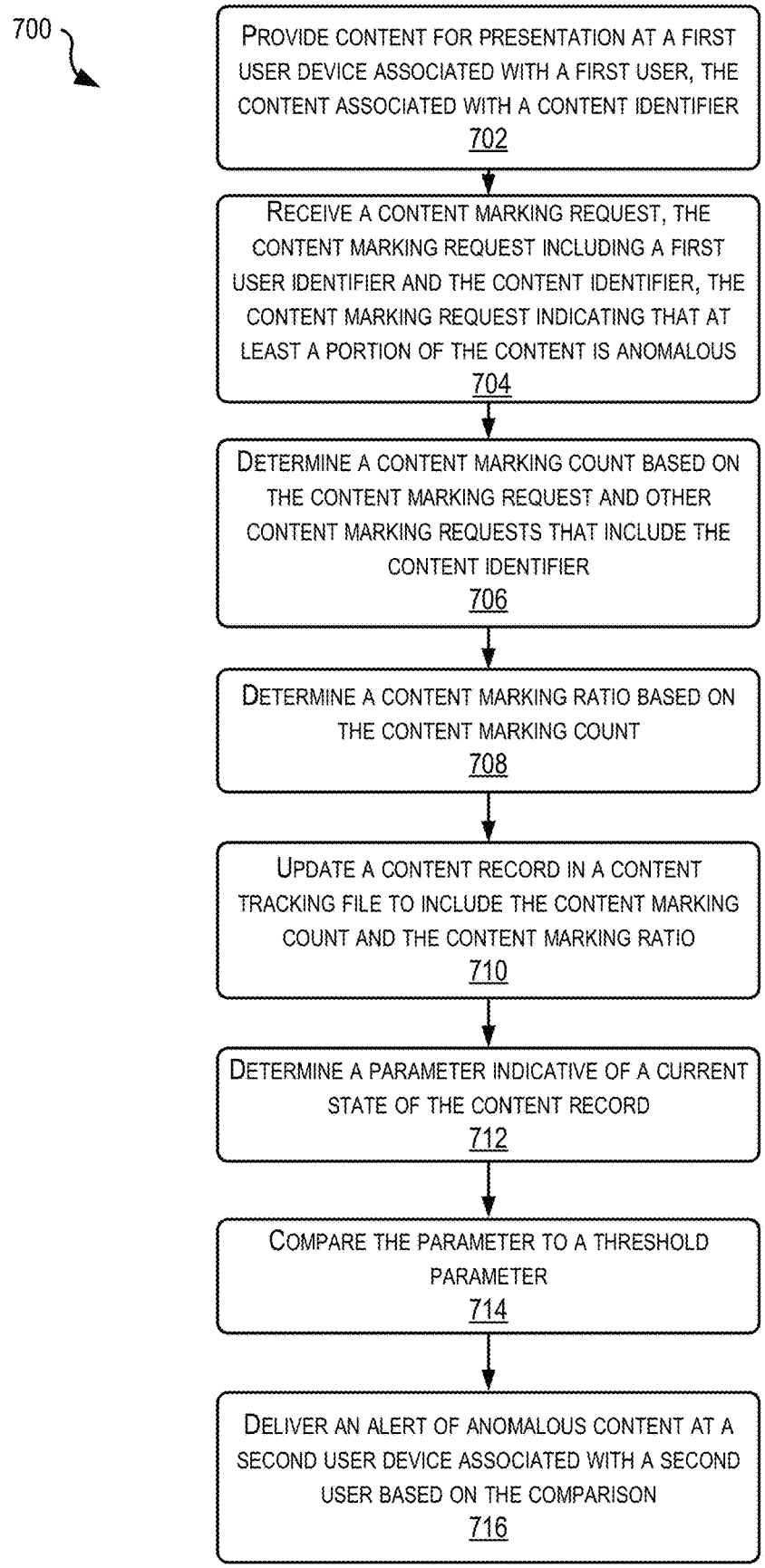
FIG. 7 illustrates an example flowchart showing a process for implementing techniques relating to anomalous content marking and determination, according to at least one example.

FIG. 7 illustrates an example flowchart showing a process for implementing techniques relating to anomalous content marking and determination, according to at least one example. The process 700 may be especially effective at identifying or marking of anomalous content and providing alerts accordingly. The process 700 may provide a process for content users to mark or flag anomalous content. A record associated with the learning module may be updated with an indication of the anomalous content. The content marking engine 202 (FIG. 2) embodied in the computer system (112 in FIG. 1 or 210 in FIG. 2) and/or within the user device (106 in FIG. 1 or 204 in FIG. 2) may perform the process 700. Thus, while the description below is from the perspective of the computer system 210, the user device 204 may also perform the process 700 or portions of the process 700.

The process 700 may begin at block 702 by the computer system (112 in FIG. 1 or 210 in FIG. 2) providing content for presentation at a first user device associated with a first user, the content associated with a content identifier. The first user device may be user device 204 in FIG. 2. The content may include video, audio, pictorial illustration, text, or other suitable type of file capable of communicating information, facts, or data. In some examples, the content or content portion may be the video and the corresponding transcript as discussed for content 104 (in FIG. 1) and the content may be correlated by a plurality of timestamps. The content 104 may include a content portion 102. The content portion 102 may further be divided into a subset of content portions 102(1)-102(N). The subset of content portions 102(1)-102(N) may be characterized by any factor as needed. In some examples, the content 104 may be a video and the subset of content portions 102(1)-102(N) may be characterized by their durations or lengths. Each of the subset of content portions 102(1)-102(N) may have different lengths (e.g., from one or two seconds of length to the duration of the content portion 102). In some examples, the content portion 102 and the subset of content portions 102(1)-102(N) may be characterized by file size. The file size of each of the subset of content portions 102(1)-102(N) may be configurable to a desired size and need not be equal-sized. In some examples, the content 104 may have different versions. Example subset of content portions 102(1)-102(N) may be a transcript accompanying a video content and having a different file format, different parts of a learning module (e.g., question 2, 4, and 5), different parts or segments of a video content (e.g., video segment from 2:34 to 2:45 and video segment from 3:00 to 4:00), different parts of a visual presentation (e.g., a picture shows the Twin Towers in NYC and a tourist in the same picture or a different picture from the same set of visual presentation as the NYC picture). In some examples, each of the subset of content portions 102(1)-102(N) may be associated with a portion identifier that uniquely identifies the corresponding subset of content portion (e.g., 102(1)). In some examples, the portion identifier may be a plurality of timestamps, markup language (e.g., reference a tag of the text), or any method that can identify a subset of content portion as desired.

The process 700 may continue at block 704 by the computer system (112 in FIG. 1 or 210 in FIG. 2) receiving, from the first user device, a content marking request, the content marking request including a first user identifier and the content identifier, the content marking request indicating that at least a portion of the content is anomalous. The content or content portion may be anomalous for including outdated, erroneous, or inaccurate information, facts, or data. Example anomalous content or content portion may be a pictorial illustration including wrong reference numbers, false, misleading, or outdated facts or data (e.g., the address of Company X is has changed to 001 street but the content is still showing the Company's address as 000 street, the content showing the density of water as 1,100 g/cm$^3$), transcript accompanying a video content or text content including typographical errors, etc. In some examples, the content or content portion may be anomalous for including technical issues or errors (e.g., wrong version of file is being presented to users, users cannot open the content, indiscernible audio file, low-image quality etc.). In some examples, the content may include content audio as a content portion, an example anomalous audio content portion may include mispronunciation or misspoken terms.

The content marking request may be received by the computer system (112 in FIG. 1 or 210 in FIG. 2) via a user interface or graphical user interface on the first user device. The content marking request may be received as discussed in relation to the user interface 400 in FIG. 4 and/or the user interface 500 in FIG. 5. The content marking request may be received via one or more mechanisms. For example, the computer system may receive the marking request as a voice input that contains one or more words. In another examples, the computer system may receive a click (or tap) via a graphical user interface (e.g., a button) on the first user device. The click (or tap) indicates that the user marks the content (104 in FIG. 1) or any content portion 102 of the content through a screen of the first user device (e.g., to mark the content as anomalous). In some examples, the user interface or graphical user interface may include a graphical control element such as a progress bar. The control element may be correlated with the content by the plurality of timestamps. In some examples, the control element may be accompanied by a textual representation of the progress in a percent format. The control element may receive various controls allowing users to selectively marking the content and any content portion as desired. For example, the control element may be a draggable progress bar and users may drag a portion of the progress bar to selectively mark the content portion that contains anomalous information. In some examples, the computer system may also receive multiple words via keyboard input of the user device as additional explanations or descriptions (e.g., "the marked content contains data X that is erroneous and the correct data should be Y") associated with the marking request. Any suitable input mechanism may be used to perform embodiments of the present disclosure. In some examples, the content may include multiple versions and the marking request may be directed to and associated with one of the multiple versions.

In some examples, the content marking request may be received via a content marking request section of a user interface. The content marking request section may allow the user to indicate that the content or any content portion is anomalous. In some examples, the content marking request section may use an interactive element (e.g., a button or any graphical symbol) to collect the content marking request from the user. In some examples, in response to a user interaction (e.g., clicking on the button) with the interactive element, the computer system (e.g., 112, 210, and 320 as illustrated in FIG. 1, FIG. 2, and FIG. 3) may perform the process 120 or the process 300 as illustrated in FIG. 1 and FIG. 3. In some examples, in response to user interaction with the interactive element, the user device (e.g., 106(1)-106(N) and 204(1)-204(N) in FIG. 1 and FIG. 2) may push or display a confirmation notification to the user device to invite the user to confirm their content marking request. In some examples, in response to the user interaction with the interactive element, the computer system may highlight, shade, transition to another user interface, or change the appearance of the interactive element in any appropriate mechanism to reflect the user interaction. In some examples, in response to the user interaction with the interactive element, the user interface may prompt a text box at the user device and invite the user to input additional details related to the interaction with the interactive element. The user may choose to close the text box without providing additional details.

In some examples, after the user has interacted with the interactive element, the user device may generate a marking request based on the user interaction with the interactive element and transmit the marking request to the computer system. The computer system may accordingly update (e.g., aggregate or add one count to the content marking count) the content marking count for the content in response to receiving the marking request based on the user interaction with the interactive element. In some examples, the content marking request section of the user interface may contain additional interactive elements (e.g., buttons, graphical symbols, etc.) allowing users to provide marks regarding different properties, status, and/or characteristics of the content. Example properties, status, and/or characteristics may include relevance, accuracy, content available in foreign languages, etc. The text string of the interactive element may be adjusted as desired.

In some examples, after having received the content marking request, the computer system may validate the content marking request based on the first user identifier and the content identifier. In some examples, the validation process may include, based on the content identifier, determining if the associated content is present in a validation database. Additionally, the validation process may include, based on the user identifier, determining if the associated user is an authorized user (e.g., a registered user) to view and/or make a content marking request of the corresponding content by determining if the associated content is present in the validation database. The user may also be validated via checking the presence and authenticity of credentials provided by the user in the validation database. In some examples, the content may be validated against a first database and the user may be validated against a second database.

The process 700 may continue at block 706 by the computer system (112 in FIG. 1 or 210 in FIG. 2) determining a content marking count based on the content marking request and other content marking requests that include the content identifier. The content marking count may be determined based on the content marking request and other content marking requests that include the content identifier. The content marking count may be an aggregation or summation of content marking request received from user devices (106 in FIG. 1 or 204 in FIG. 2) associated with the content identifier. In some examples, the computer system may add an increment of one to the content marking count whenever the computer system receives a content marking request of the content. In some examples, as the content may include content portions 102(1)-102(N) and more than one content marking requests may be received for some of the content portions 102(1)-102(N) (e.g., content marking requests 110 are only received for content portion 102(1) and 102(2) as illustrated in FIG. 1), the computer system may add an increment of two to the content marking count accordingly. In some examples, each of the subset of content portions 102(1)-102(N) may be associated with a portion identifier that uniquely identifies the corresponding subset of content portion (e.g., 102(1)). Based on the portion identifier, the content marking request may be specifically identified over the content portion that is associated with the portion identifier. The value of increment to be added to the content marking count may be adjusted as desired and is not required to be equal to the actual number of marking requests of the content. In some examples, the content may have different versions and the marking request may be directed to and associated with one of the multiple versions. The content marking count accordingly may also be version specific.

The process 700 may continue at block 708 by the computer system (112 in FIG. 1 or 210 in FIG. 2) determining a content marking ratio based on the content marking count. In some examples, the content marking ratio (R) may be calculated by dividing the content marking count determined at block 706 by a count of interactions with the content. The count of interactions may be an aggregation or summed value of interactions with the content received from user devices. In some examples, the interactions with the content may be the viewing of the content or any content portion via the user device (e.g., 106 in FIG. 1 or 204 in FIG. 2).

The process 700 may continue at block 710 by the computer system updating a content record in a content tracking file (e.g., 118 in FIG. 1) to include the content marking count and the content marking ratio. The content tracking file may be readable and executable to the computer system (e.g., 112). In some examples, the content tracking file 118 may be stored in the computer system (e.g., 112 or the user device e.g., 106).

In some examples, the computer system may compare the content marking ratio to a threshold ratio. Based on the comparison result (e.g., the content marking ratio exceeds a threshold ratio of 30%), the computer system may determine to modify a property or characteristic (e.g., the title color of the content) or display an alert accompanying the content to communicate the anomalous status of the content to a different user interacting with the content. The modification and alert may be in any form or mechanism as desired. Example modification include changing the color of the content portion containing the anonymous information, highlighting the content portion (e.g., text content), or displaying a warning symbol (e.g., an exclamation mark or a flag) on the user device whenever a user interacts with the content.

The process 700 may continue at block 712 by the computer system determining a parameter (P) indicative of a current state of the content record. In some examples, the parameter may be determined based on the content marking count and/or the content marking ratio. In some examples, the parameter (P) could be a weighted average value based on the content marking count. The contributing weight of the content marking count determined at block 706 may be determined based on various relevant factors as well as the nature of the anomaly causing the content to be marked. For example, the contributing weight of the content marking count may be determined based on the classification (e.g., the subject topic of the content such as investment, art appreciation, language learning, etc.) of the content and the content being marked for containing outdated information (e.g., Mr. X is no longer the president of country A). In some examples, the relevant factors of the content may be stored as a metafile that is associated with the content by the content identifier. In some examples, the parameter (P) may be determined by using a machine learning model. The machine learning model may determine the contributing factor for the content marking count or the content marking ratio based on inputs from users (content administrators and learners), credible third-party input sources, etc. In some examples, the computer system may automatically, dynamically, or periodically adjust the contributing factor. In some examples, via the user interface 400, 500, or 600 as described in FIG. 4, FIG. 5, or FIG. 6, the computer system may display the parameter (P) to users as a comprehensive rating score of the content.

The process 700 may continue at block 714 by the computer system comparing the parameter (P) to a threshold parameter. The threshold parameter may be a numerical value, a dynamic variable, and the like. The threshold parameter may be predetermined or dynamically adjusted. Similar to the parameter, the threshold parameter may also be a weighted average value based on various relevant factors and the potential nature of anomaly that may cause the content to be marked. The computer system may determine the threshold parameter by using a machine learning model. The comparison between the parameter and the threshold parameter may determine a mathematical relationship between the parameter and the parameter. In some examples, the computer system may determine whether the numerical value of the parameter (P) is greater than the numerical value of a threshold parameter. In some examples, when the computer system determines that the parameter exceeds the threshold parameter, the computer system may prompt a real-time notification or send an email to a supervising entity or user (e.g., an instructor or administrator of an online learning module) regarding the anomalous status of the content.

The process 700 may continue at block 716 by the computer system delivering an alert of anomalous content at a second user device associated with a second user based on the comparison. The second user device may be an administrator who assigns the content to the first user at block 702. In some examples, the computer system may modify a property or characteristic (e.g., change the title color of the content, add additional graphical symbols) of the content so that the second user is alerted of the anomalous status of the content. In some examples, the computer system may deliver the alert in the form of a graphical symbol (e.g., a flag) at the second user device. The computer system may display the graphical symbol (e.g., the flag) adjacent to the content being presented to the user via a user interface. In some examples, the alert may include a color indicator. The color indicator may further include a color code and the content identifier of the corresponding content. The color indicator, as well as the color code, may be determined based on the content marking count, the content marking ratio, or the parameter determined at block 708 and/or block 712. In some examples, a first color code is assigned by the computer system to the content marking ratio or the parameter in a first value range, a second color code is assigned to the content marking ratio or the parameter in a second value range, and a third color code is assigned to the content marking ratio or the parameter in a third value range. In some examples, the computer system may assign yellow to the content having a content marking ratio in a range of 3-5%, 5-10%, 10-15%, 15-20%, 20-25%, 25-30%, 30-35%, 35-40%, 40-45%, or 45-50%. In some examples, the computer system may assign red to the content having a content marking ratio in a range of 50-55%, 55-60%, 60-65%, 65-70%, 70-75%, 75-80%, 80-85%, 85-90%, 90-95%, or 95-100%. For example, when the computer system delivers the alert as a flag, the flag may be displayed as a yellow flag if the content marking ratio is 5%. The flag may be displayed as a red flag if the content marking ratio is 85%.

Figure 8:
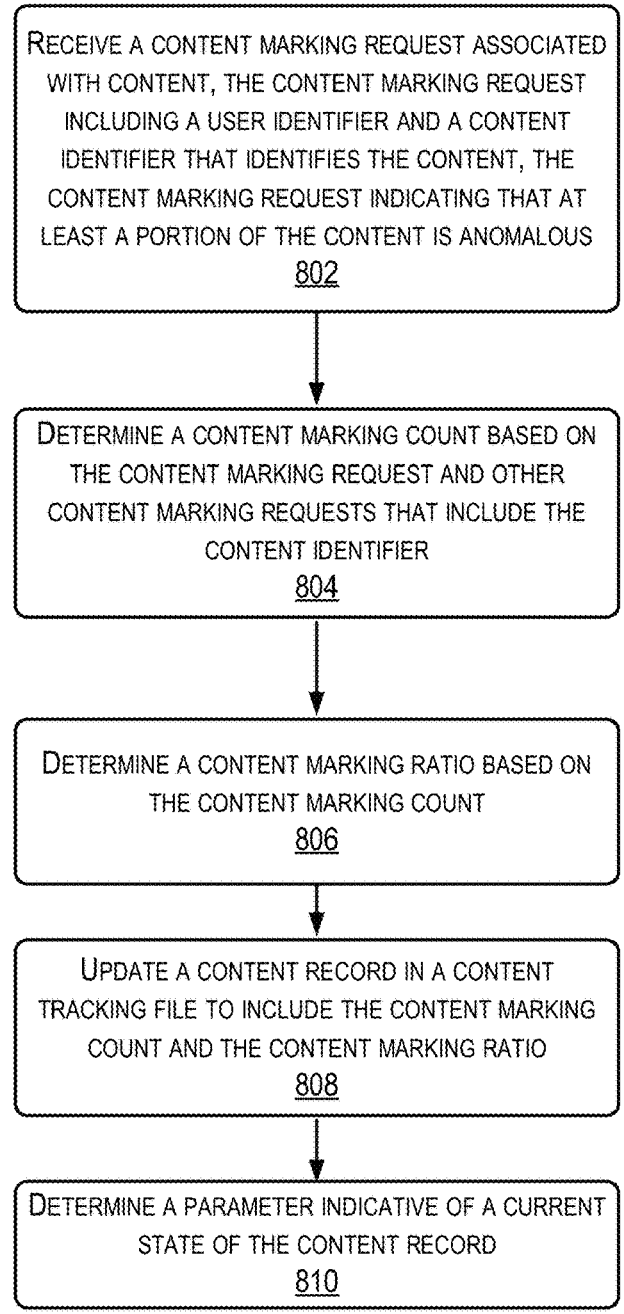
FIG. 8 illustrates an example flowchart showing a process for implementing techniques relating to anomalous content marking and determination, according to at least one example.

FIG. 8 illustrates an example flowchart showing a process for implementing techniques relating to anomalous content marking and determination, according to at least one example. The process 800 may effectively identifying or marking of anomalous content (e.g., a learning module). The process 800 may provide a process for content users to mark or flag anomalous content or content portion. A content record associated with the learning module may be updated with an indication of the anomalous content. Based on the determined content marking count, the content record of the content, and the parameter, the content marking engine 202 (FIG. 2) embodied in the computer system (112 in FIG. 1 or 210 in FIG. 2) and/or within the user device (106 in FIG. 1 or 204 in FIG. 2) may perform the process 800. Thus, while the description below is from the perspective of the computer system 210 (in FIG. 2), the user device 204 may also perform the process 800 or portions of the process 800.

The process 800 may begin at block 802 by the computer system (112 in FIG. 1 or 210 in FIG. 2) receiving a content marking request associated with content, the content marking request including a user identifier and a content identifier that identifies the content, the content marking request indicating that at least a portion of the content is anomalous. The content marking request may be received by the computer system (112 in FIG. 1 or 210 in FIG. 2) via a user interface or graphical user interface on the first user device.

The marking request may be received from a first user device via one or more mechanisms. For example, the computer system may receive the marking request as a voice input that contains one or more words. In another examples, the computer system may receive a click (or tap) via a graphical user interface (e.g., a button) on the first user device. The click (or tap) indicates that the user marks the content (104 in FIG. 1) or any content portion 102 of the content through a screen of the first user device (e.g., to mark the content as anomalous). In some examples, the user interface or graphical user interface may include a graphical control element such as a progress bar. The control element may be correlated with the content by the plurality of timestamps. In some examples, the control element may be accompanied by a textual representation of the progress in a percent format. The control element may receive various controls allowing users to selectively marking the content and any content portion as desired. For example, the control element may be a draggable progress bar and users may drag a portion of the progress bar to selectively mark the content portion that contains anomalous information. In some examples, the computer system may also receive multiple words via keyboard input of the user device as additional explanations or descriptions (e.g., "the marked content contains data X that is erroneous and the correct data should be Y") associated with the marking request. Any suitable input mechanism may be used to perform embodiments of the present disclosure. In some examples, the content may include multiple versions and the marking request may be directed to and associated with one of the multiple versions. In some examples, the marking request 110 may be generated by a computer system (e.g., the computer system 112), which may be configured to implement an algorithm (e.g., a machine learning model). For example, the content may be loaded into a machine learning model that has been trained to identify anomalous content. Output from the machine learning model may include a probability that the input content is anomalous. In some examples, this may include classifying the content not only as anomalous or not anomalous, but also into one of a plurality of types of anomalous (e.g., outdated, incorrect, offensive, illegal, etc.). The computer system that operates the machine learning model may generate the content marking request based on output from the machine learning model. The computer system may send, provide, or otherwise process the content marking request, as described in block 802. In some examples, the computer system 112 may be the computer system that operates the machine learning model.

The content or a portion of content being marked for anomalous may be the content 104 as discussed in FIG. 1. The content may include at least one portion of the content (or "a content portion") 102. The content portion 102 may further include subset of content portions (e.g., 102(1)-102(N) in FIG. 1). The subset of content portions (e.g., 102(1)-102(N) in FIG. 1) may be characterized by any factor as needed. In some examples, the content may be a video and the subset of content portions (e.g., 102(1)-102(N) in FIG. 1) may be characterized by their durations or lengths. Each of the subset of content portions (e.g., 102(1)-102(N) in FIG. 1) may have different lengths (e.g., from one or two seconds of length to the duration of the content portion 102). In some examples, the content portion 102 and the subset of content portions (e.g., 102(1)-102(N) in FIG. 1) may be characterized by file size. The file size of each of the subset of content portions (e.g., 102(1)-102(N) in FIG. 1) may be configurable to a desired size and need not be equal-sized. In some examples, the content 104 may have different versions. Example subset of content portions (e.g., 102(1)-102(N) in FIG. 1) may be a transcript accompanying a video content and having a different file format, different parts of a learning module (e.g., question 2, 4, and 5), different parts or segments of a video content (e.g., video segment from 2:34 to 2:45 and video segment from 3:00 to 4:00), different parts of a visual presentation (e.g., a picture shows the Twin Towers in NYC and a tourist in the same picture or a different picture from the same set of visual presentation as the NYC picture). In some examples, each of the subset of content portions (e.g., 102(1)-102(N) in FIG. 1) may be associated with a portion identifier that uniquely identifies the corresponding subset of content portion (e.g., 102(1)). In some examples, the portion identifier may be a plurality of timestamps, markup language (e.g., reference a tag of the text), or any method that can identify a subset of content portion as desired. In some examples, the process may further determine a marking time of the content marking request, the marking time being correlated to the video and the corresponding transcript by the plurality of timestamps.

The process 800 may continue at block 804 by the computer system (112 in FIG. 1 or 210 in FIG. 2) determining a content marking count based on the content marking request and other content marking requests that include the content identifier. The content marking count may be determined based on the content marking request and other content marking requests that include the content identifier. The content marking count may be an aggregation or summation of content marking request received from user devices (106 in FIG. 1 or 204 in FIG. 2) for the content associated with the content identifier. In some examples, the computer system may add an increment of one to the content marking count for the content associated with the content identifier whenever the computer system receives a content marking request of the content. In some examples, as the content may include content portions (e.g., 102(1)-102(N) in FIG. 1) and more than one content marking requests may be received for some of the content portions 102(1)-102(N) (e.g., content marking requests 110 are only received for content portion 102(1) and 102(2) as illustrated in FIG. 1), the computer system may add an increment of two to the content marking count accordingly. The value of increment to be added to the content marking count may be adjusted as desired and is not required to be equal to the actual number of marking requests of the content. In some examples, the computer system may, at a predetermined time interval, automatically determine the content marking count based on additional content marking requests and other content marking requests including the content identifier.

The process 800 may continue at block 806 by the computer system (112 in FIG. 1 or 210 in FIG. 2) determining a content marking ratio based on the content marking count. In some examples, the content marking ratio (R) may be calculated by dividing the content marking count determined at block 804 by a count of interactions with the content. The count of interactions may be an aggregation or summed value of interactions with the content received from user devices. In some examples, the interactions with the content may be the viewing of the content or any content portion via the user device (e.g., 106 in FIG. 1 or 204 in FIG. 2).

The process 800 may continue at block 808 by the computer system (112 in FIG. 1 or 210 in FIG. 2) updating a content record in a content tracking file to include the content marking count and the content marking ratio. The content tracking file (e.g., content tracking file 118 in FIG. 1) may be communicatively connected to the computer system.

In some examples, to update the content record, the computer system may modify a property or characteristic (e.g., change the title color of the content) or display an alert accompanying the content to communicate the anomalous status of the content to a different user interacting with the content. The modification and displaying of alert may be in any form or mechanism as desired. Example modification include changing the color of the content portion containing the anonymous information, highlighting the content portion (e.g., text content), or displaying a warning symbol (e.g., an exclamation mark or a flag) on the user device whenever a user interacts with the content. The modification of content property or characteristic or display an alert accompanying the content may be implemented with the user interface 400, 500, and 600 of FIG. 4, FIG. 5, and FIG. 6, respectively.

In some examples, the computer system may update the content record of the content associated with the content identifier so that a graphical symbol (e.g., a flag) is displayed with the content for future presentations. The graphical symbol may include a color code. The color code may be determined based on the content marking count of block 804 or the content marking ratio of block 806. In some examples, a first color code is assigned by the computer system to the content marking ratio or the content marking count in a first value range, a second color code is assigned to the content marking ratio or the content marking count in a second value range, and a third color code is assigned to the content marking ratio or the content marking count in a third value range. In some examples, the computer system may assign yellow to the content having a content marking ratio in a range of 3-5%, 5-10%, 10-15%, 15-20%, 20-25%, 25-30%, 30-35%, 35-40%, 40-45%, or 45-50%. In some examples, the computer system may assign red to the content having a content marking ratio in a range of 50-55%, 55-60%, 60-65%, 65-70%, 70-75%, 75-80%, 80-85%, 85-90%, 90-95%, or 95-100%. For example, the computer system may update the graphical symbol (e.g., the flag) to the content record so that the flag is displayed as a yellow flag for the content marking ratio of 5% and the flag is displayed as a red flag for the content marking ratio of 85%.

The process 800 may continue at block 810 by the computer system (112 in FIG. 1 or 210 in FIG. 2) determining a parameter indicative of a current state of the content record. In some examples, the parameter may be determined based on the content marking count and/or the content marking ratio. In some examples, the parameter (P) could be a weighted average value based on the content marking count determined at block 804. The contributing weight of the content marking count determined at block 804 may be determined based on various relevant factors as well as the nature of the anomaly causing the content to be marked. For example, the contributing weight of the content marking count may be determined based on the classification (e.g., the subject topic of the content such as investment, art appreciation, language learning, etc.) of the content and the content being marked for containing outdated information (e.g., Mr. X is no longer the president of country A). In some examples, the relevant factors of the content may be stored as a metafile that is associated with the content by the content identifier. In some examples, the parameter (P) may be determined by using a machine learning model. The machine learning model may determine the contributing factor for the content marking count or the content marking ratio based on inputs from users (content administrators and learners), credible third-party input sources, etc. In some examples, the computer system may automatically, dynamically, or periodically adjust the contributing factor. The computer system may also automatically, dynamically, or periodically determining the parameter (P) without being manually triggered. In some examples, via the user interface 400, 500, or 600 as described in FIG. 4, FIG. 5, or FIG. 6, the computer system may display the parameter (P) to users as a comprehensive rating score of the content.

In some examples, the process 800 may further include, by the computer system, determining that the content is anomalous based on the parameter determined at block 810. The computer system may determine that the content is anomalous by comparing the parameter to a threshold parameter. In some examples, if the parameter exceeds the threshold parameter, the computer determines that the corresponding content is anomalous.

In some examples, after having determined that the content is anomalous based on the parameter determined at block 810, the computer system may further deliver an alert associated with the anomalous content at a user device associated with a user. In some examples, the computer system may deliver the alert by pushing a real-time notification of anomalous content via a user interface on the user device. In some examples, the computer system may deliver the alert by sending an email including details (e.g., the content marking count being accumulated for the past two weeks) regarding the anomalous state of the content. In some examples, the computer system may deliver the alert by changing a property or characteristic of the content associated with the content identifier. For example, the computer system may change the font, the color, or any other features of the content title for presentation at the user device. In some examples, the computer system may deliver the alert in the form of a graphical symbol (e.g., a flag) at the user device. The computer system may display the graphical symbol (e.g., the flag) adjacent to the content being presented to the user via a user interface. In some examples, the alert may include a color indicator. The color indicator may further include a color code and the content identifier of the corresponding content. The color indicator, as well as the color code, may be determined based on the content marking count, the content marking ratio, or the parameter. In some examples, a first color code is assigned by the computer system to the content marking ratio or the parameter in a first value range, a second color code is assigned to the content marking ratio or the parameter in a second value range, and a third color code is assigned to the content marking ratio or the parameter in a third value range. In some examples, the computer system may assign yellow to the content having a content marking ratio in a range of 3-5%, 5-10%, 10-15%, 15-20%, 20-25%, 25-30%, 30-35%, 35-40%, 40-45%, or 45-50%. In some examples, the computer system may assign red to the content having a content marking ratio in a range of 50-55%, 55-60%, 60-65%, 65-70%, 70-75%, 75-80%, 80-85%, 85-90%, 90-95%, or 95-100%. For example, when the computer system delivers the alert as a flag, the flag may be displayed as a yellow flag if the content marking ratio is 5%. The flag may be displayed as a red flag if the content marking ratio is 85%.

In some examples, the process 800 may further include, by the computer system, removing the respective content from the content database based on the parameter. The content database may be stored in one or more geographically distributed content delivery servers. In some examples, the computer system may automatically or periodically (at predetermined time intervals) remove content based on the value of parameter. In some examples, the computer system may automatically or periodically (at predetermined time intervals) remove content having a parameter value that is greater or less than a removal threshold value. In some examples, the computer system may move and store the removed content to a long-term data storage. In some examples, the content moved to the long-term data storage may not be regularly accessed by users.

In some examples, the process 800 may further include receiving a request to display the content from a user device associated with a user. The user may be a learner or viewer of an online learning module. In response to receiving the request to display the content from the user device displaying, the computer system may display, by a user interface and at the user device, an alert of anomalous content to the user device at the marking time. For example, the computer system may receive from user A's device, a content marking request associated with content (e.g., a video learning module) identified by a content identifier and the computer system determines a marking time of 3:45 (or the time when user A made the marking request). The computer system may later receive from user B's device, a request to display the content associated with the content identifier. The computer system may present, via a user interface at user B's device, the requested content with an alert accompanying the content appearing at the marking time (e.g., timestamp 3:45 of the video) of the content so that user B is notified that the content portion being presented at the marking time may contain anomalous content.

Figure 9:
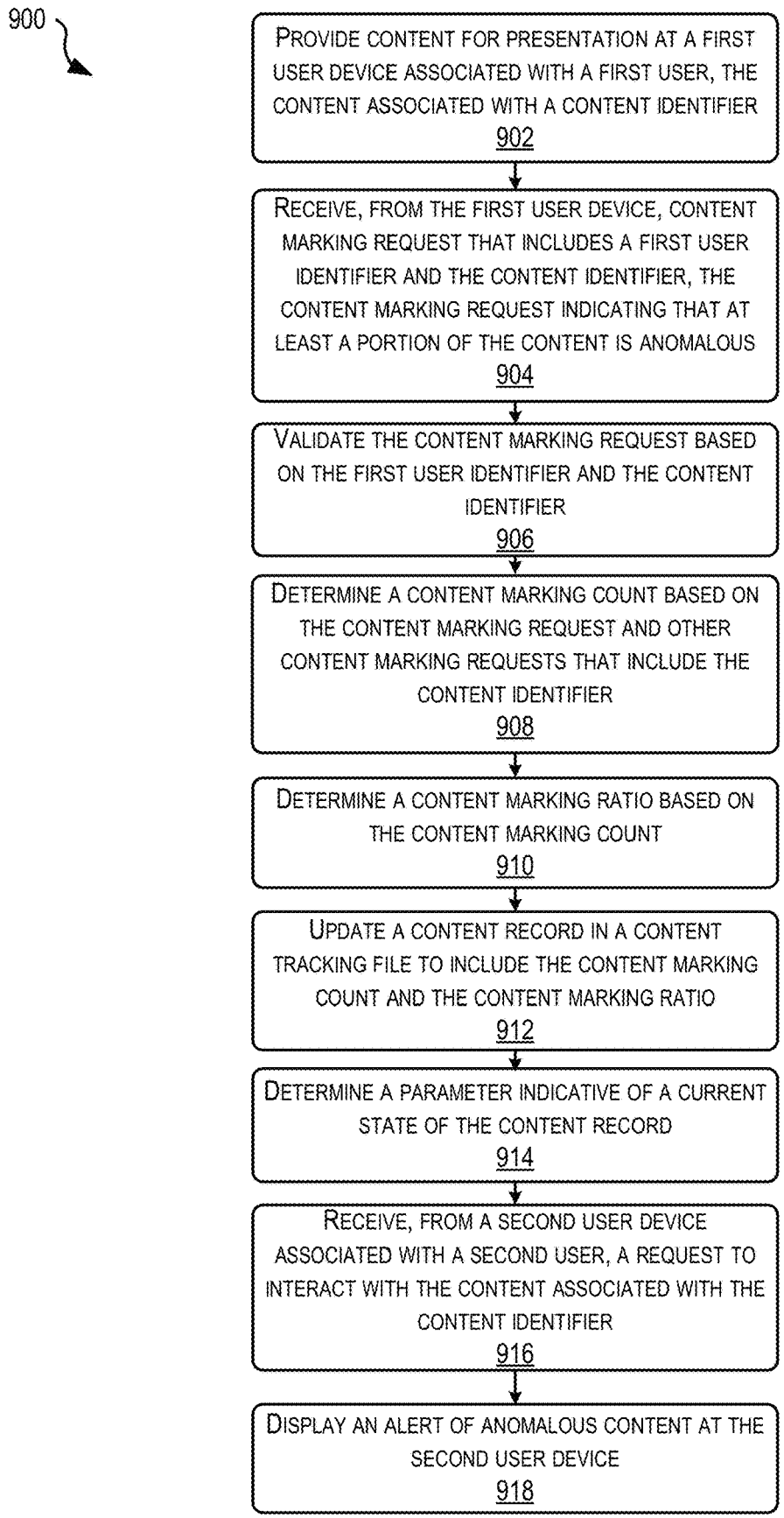
FIG. 9 illustrates an example flowchart showing a process for implementing techniques relating to anomalous content marking and determination, according to at least one example.

FIG. 9 illustrates an example flowchart showing a process for implementing techniques relating to anomalous content marking and determination, according to at least one example. The process 900 may effectively identify or mark of anomalous content and provide alerts accordingly. The process 900 may provide a process for content users to mark or flag anomalous content. A record associated with the learning module may be updated with an indication of the anomalous content. The process 900 may provide alert of anomalous content to the content users. Based on the determined content marking count, the content record of the content, and the parameter, the content marking engine 202 (FIG. 2) embodied in the computer system (112 in FIG. 1 or 210 in FIG. 2) and/or within the user device (106 in FIG. 1 or 204 in FIG. 2) may perform the process 800. Thus, while the description below is from the perspective of the computer system 210 (in FIG. 2), the user device 204 may also perform the process 900 or portions of the process 900.

The process 900 may begin at block 902 by the computer system (112 in FIG. 1 or 210 in FIG. 2) providing content for presentation at a first user device associated with a first user, the content associated with a content identifier. The first user device may be user device 106 in FIG. 1 or 204 in FIG. 2. The content may include video, audio, pictorial illustration, text, or other suitable type of file capable of communicating information, facts, or data. In some examples, the video and the corresponding transcript of the content 104 (in FIG. 1) may be correlated by a plurality of timestamps. The content (e.g., 104 in FIG. 1) may include a content portion (e.g., 102 in FIG. 1). The content portion (e.g., 102 in FIG. 1) may further be divided into a subset of content portions (e.g., 102(1)-102(N) in FIG. 1). The subset of content portions (e.g., 102(1)-102(N) in FIG. 1) may be characterized by any factor as needed. In some examples, the content may be a video and the subset of content portions (e.g., 102(1)-102(N) in FIG. 1) may be characterized by their durations or lengths. Each of the subset of content portions (e.g., 102(1)-102(N) in FIG. 1) may have different lengths (e.g., from one or two seconds of length to the duration of the content portion 102). In some examples, the content portion 102 and the subset of content portions (e.g., 102(1)-102(N) in FIG. 1) may be characterized by file size. The file size of each of the subset of content portions (e.g., 102(1)-102(N) in FIG. 1) may be configurable to a desired size and need not be equal-sized. In some examples, the content 104 may have different versions. Example subset of content portions (e.g., 102(1)-102(N) in FIG. 1) may be a transcript accompanying a video content and having a different file format, different parts of a learning module (e.g., question 2, 4, and 5), different parts or segments of a video content (e.g., video segment from 2:34 to 2:45 and video segment from 3:00 to 4:00), different parts of a visual presentation (e.g., a picture shows the Twin Towers in NYC and a tourist in the same picture or a different picture from the same set of visual presentation as the NYC picture). In some examples, each of the subset of content portions (e.g., 102(1)-102(N) in FIG. 1) may be associated with a portion identifier that uniquely identifies the corresponding subset of content portion (e.g., 102(1)). In some examples, the portion identifier may be a plurality of timestamps, markup language (e.g., reference a tag of the text), or any method that can identify a subset of content portion as desired.

The process 900 may continue at block 904 by the computer system (112 in FIG. 1 or 210 in FIG. 2) receiving, from the first user device, content marking request that includes a first user identifier and the content identifier, the content marking request indicating that at least a portion of the content is anomalous.

The content or content portion may be anomalous for being outdated or erroneous. The content or content portion may be anomalous for including outdated, erroneous, and/or inaccurate information, facts, and/or data. Example anomalous content or content portion may be a pictorial illustration including wrong reference numbers, false, misleading, or outdated facts or data (e.g., the address of Company X is has changed to 001 street but the content is still showing the Company's address as 000 street, the content showing the density of water as 1,100 $g/ca^{mc}$), transcript accompanying a video content or text content including typographical errors, etc. In some examples, the content or content portion may be anomalous for including technical issues or errors (e.g., wrong version of file is being presented to users, users cannot open the content, indiscernible audio file, low-image quality etc.). In some examples, the content may content audio content portion, an example anomalous audio content portion may include mispronunciation or misspoken terms.

The content marking request may be received by the computer system (112 in FIG. 1 or 210 in FIG. 2) via a user interface or graphical user interface on the first user device. The marking request may be received via one or more mechanisms. For example, the computer system may receive the marking request as a voice input that contains one or more words. In another examples, the computer system may receive a click (or tap) via a graphical user interface (e.g., a button) on the first user device. The click (or tap) indicates that the user marks the content (104 in FIG. 1) or any content portion 102 of the content through a screen of the first user device (e.g., to mark the content as anomalous). In some examples, the user interface or graphical user interface may include a graphical control element such as a progress bar. The control element may be correlated with the content by the plurality of timestamps. In some examples, the control element may be accompanied by a textual representation of the progress in a percent format. The control element may receive various controls allowing users to selectively marking the content and any content portion as desired. For example, the control element may be a draggable progress bar and users may drag a portion of the progress bar to selectively mark the content portion that contains anomalous information. In some examples, the computer system may also receive multiple words via keyboard input of the user device as additional explanations or descriptions (e.g., "the marked content contains data X that is erroneous and the correct data should be Y") associated with the marking request. Any suitable input mechanism may be used to perform embodiments of the present disclosure. In some examples, the content may include multiple versions and the marking request may be directed to and associated with one of the multiple versions.

In some examples, the content marking request may be received via a content marking request section of a user interface as illustrated in FIG. 4 and FIG. 5. The content marking request section may allow the user to indicate that the content or any content portion is anomalous. In some examples, the content marking request section may use an interactive element (e.g., a button or any graphical symbol) to collect the content marking request from the user. In some examples, in response to a user interaction (e.g., clicking on the button) with the interactive element, the computer system (e.g., 112, 210, and 320 as illustrated in FIG. 1, FIG. 2, and FIG. 3) may perform the process 120 or the process 300 as illustrated in FIG. 1 and FIG. 3. In some examples, in response to user interaction with the interactive element, the user device (e.g., 106(1)-106(N) and 204(1)-204(N) in FIG. 1 and FIG. 2) may push or display a confirmation notification to the user device to invite the user to confirm their content marking request. In some examples, in response to the user interaction with the interactive element, the computer system may highlight, shade, transition to another user interface, or change the appearance of the interactive element in any appropriate mechanism to reflect the user interaction. In some examples, in response to the user interaction with the interactive element, the user interface may prompt a text box at the user device and invite the user to input additional details related to the interaction with the interactive element. The user may choose to close the text box without providing additional details.

In some examples, after the user has interacted with the interactive element, the user device may generate a marking request based on the user interaction with the interactive element and transmit the marking request to the computer system. The computer system may accordingly update (e.g., aggregate or add one count to the content marking count) the content marking count for the content in response to receiving the marking request based on the user interaction with the interactive element. In some examples, the content marking request section of the user interface may contain additional interactive elements (e.g., buttons, graphical symbols, etc.) allowing users to provide marks regarding different properties, status, and/or characteristics of the content. Example properties, status, and/or characteristics may include relevance, accuracy, content available in foreign languages, etc. The text string of the interactive element may be adjusted as desired.

The process 900 may continue at block 906 by the computer system validating the content marking request based on the first user identifier and the content identifier. The content 104 may be associated with a content identifier that is unique to the content 104. In some examples, the user identifier and/or the content identifier may be stored in an ID database (e.g., the ID library 234B in FIG. 2). The ID database may be stored in one or more geographically distributed content delivery servers. To validate the content and the user identifier associated with the user (e.g., 108 in FIG. 2 or 206 in FIG. 2), the computer system may determine if the administrator user has assigned the content to the user associated with the user identifier or whether the user associated with the user identifier is authorized to view the content provided to the user at block 902. In some examples, based on the content identifier, the validation process may determine if the content receiving the content marking request is present in a database (e.g., marked content library 234C in FIG. 2) that is communicatively connected to the computer system. In some examples, the database may be stored in one or more geographically distributed content delivery servers.

The process 900 may continue at block 908 by the computer system determining a content marking count based on the content marking request and other content marking requests that include the content identifier. The content marking count may be determined based on the content marking request and other content marking requests that include the content identifier. The content marking count may be an aggregation or summation of content marking request received from user devices (106 in FIG. 1 or 204 in FIG. 2). In some examples, the computer system may add an increment of one to the content marking count whenever the computer system receives a content marking request of the content. In some examples, as the content may include content portions 102(1)-102(N) and more than one content marking requests may be received for some of the content portions 102(1)-102(N) (e.g., content marking requests 110 are only received for content portion 102(1) and 102(2) as illustrated in FIG. 1), the computer system may add an increment of two to the content marking count accordingly. In some examples, each of the subset of content portions 102(1)-102(N) may be associated with a portion identifier that uniquely identifies the corresponding subset of content portion (e.g., 102(1)). Based on the portion identifier, the content marking request may be specifically identified over the content portion that is associated with the portion identifier. The value of increment to be added to the content marking count may be adjusted as desired and is not required to be equal to the actual number of marking requests of the content. In some examples, the content may have different versions and the marking request may be directed to and associated with one of the multiple versions. The content marking count accordingly may also be version specific.

The process 900 may continue at block 910 by the computer system determining a content marking ratio based on the content marking count. In some examples, the content marking ratio (R) may be calculated by dividing the content marking count determined at block 908 by a count of interactions with the content. The count of interactions may be an aggregation or summed value of interactions with the content received from user devices. In some examples, the interactions with the content may be the viewing of the content or any content portion via the user device (e.g., 106 in FIG. 1 or 204 in FIG. 2).

The process 900 may continue at block 912 by the computer system updating a content record in a content tracking file to include the content marking count and the content marking ratio. The content tracking file may be readable and executable to the computer system (e.g., 112). In some examples, the content tracking file 118 may be stored in the computer system (e.g., 112 or the user device e.g., 106). In some examples, the content tracking file may include a plurality of tables consists of columns and rows to store the content record, the content marking count, and the content marking ratio (R).

In some examples, to update the content record, the computer system may modify a property or characteristic (e.g., change the title color of the content) or display an alert accompanying the content to communicate the anomalous status of the content to a different user interacting with the content. The modification and displaying of alert may be in any form or mechanism as desired. Example modification include changing the color of the content portion containing the anonymous information, highlighting the content portion (e.g., text content), or displaying a warning symbol (e.g., an exclamation mark or a flag) on the user device whenever a user interacts with the content. The modification of content property or characteristic or display an alert accompanying the content may be implemented with the user interface 400, 500, and 600 of FIG. 4, FIG. 5, and FIG. 6, respectively.

In some examples, the computer system may update the content record of the content associated with the content identifier so that a graphical symbol (e.g., a flag) is displayed with the content for future presentations. The graphical symbol may include a color code. The color code may be determined based on the content marking count of block 804 or the content marking ratio of block 806. In some examples, a first color code is assigned by the computer system to the content marking ratio or the content marking count in a first value range, a second color code is assigned to the content marking ratio or the content marking count in a second value range, and a third color code is assigned to the content marking ratio or the content marking count in a third value range. In some examples, the computer system may assign yellow to the content having a content marking ratio in a range of 3-5%, 5-10%, 10-15%, 15-20%, 20-25%, 25-30%, 30-35%, 35-40%, 40-45%, or 45-50%. In some examples, the computer system may assign red to the content having a content marking ratio in a range of 50-55%, 55-60%, 60-65%, 65-70%, 70-75%, 75-80%, 80-85%, 85-90%, 90-95%, or 95-100%. For example, the computer system may update the graphical symbol (e.g., the flag) to the content record so that the flag is displayed as a yellow flag for the content marking ratio of 5% and the flag is displayed as a red flag for the content marking ratio of 85%.

The process 900 may continue at block 914 by the computer system determining a parameter indicative of a current state of the content record. In some examples, the parameter may be determined based on the content marking count and/or the content marking ratio. In some examples, the parameter (P) could be a weighted average value based on the content marking count determined at block 908. The contributing weight of the content marking count determined at block 908 may be determined based on various relevant factors as well as the nature of the anomaly causing the content to be marked. For example, the contributing weight of the content marking count may be determined based on the classification (e.g., the subject topic of the content such as investment, art appreciation, language learning, etc.) of the content and the content being marked for containing outdated information (e.g., Mr. X is no longer the president of country A). In some examples, the relevant factors of the content may be stored as a metafile that is associated with the content by the content identifier. In some examples, the parameter (P) may be determined by using a machine learning model. The machine learning model may also determine the contributing factor for the content marking count or the content marking ratio based on inputs from users (content administrators and learners), credible third-party input sources, etc. In some examples, the computer system may automatically, dynamically, or periodically adjust the contributing factor. The computer system may also automatically, dynamically, or periodically determining the parameter (P) without being manually triggered. In some examples, via the user interface 400, 500, or 600 as described in FIG. 4, FIG. 5, or FIG. 6, the computer system may display the parameter (P) to users as a comprehensive rating score of the content. In some examples, the process 900 may compare the parameter (P) to a threshold parameter. The computer system may determine whether the numerical value of the parameter (P) is greater than the numerical value of the threshold parameter. In some examples, when the computer system determines that the parameter exceeds the threshold parameter, the computer system may prompt a real-time notification or send an email to a supervising entity or user (e.g., an instructor or administrator of an online learning module) regarding the anomalous status of the content.

The process 900 may continue at block 916 by the computer system receiving, from a second user device associated with a second user, a request to interact with the content associated with the content identifier. The second user may be different from the first user. The second user device may be user device 106 in FIG. 1 or 204 in FIG. 2. In some examples, the first user may be a non-administrator user and the second user may be an administrator user of the content.

The process 900 may continue at block 918 by the computer system displaying an alert of anomalous content at the second user device. The computer system may determine to display the alert anomalous content at the second user device based on the content marking count determined at block 908, the content marking ratio determined at block 910, or the parameter determined at block 914.

In some examples, the computer system may deliver the alert by pushing a real-time notification of anomalous content via a user interface on the second user device. In some examples, the computer system may deliver the alert by sending an email including details (e.g., the content marking count being accumulated for the past two weeks) regarding the anomalous state of the content. In some examples, the computer system may deliver the alert by changing a property or characteristic of the content associated with the content identifier. For example, the computer system may change the font, the color, or any other features of the content title for presentation at the second user device. In some examples, the computer system may deliver the alert in the form of a graphical symbol (e.g., a flag) at the second user device. The computer system may display the graphical symbol (e.g., the flag) adjacent to the content being presented to the user via a user interface. In some examples, the alert may include a color indicator. The color indicator may further include a color code and the content identifier of the corresponding content. The color indicator, as well as the color code, may be determined based on the content marking count, the content marking ratio, or the parameter. In some examples, a first color code is assigned by the computer system to the content marking ratio or the parameter in a first value range, a second color code is assigned to the content marking ratio or the parameter in a second value range, and a third color code is assigned to the content marking ratio or the parameter in a third value range. In some examples, the computer system may assign yellow to the content having a content marking ratio in a range of 3-5%, 5-10%, 10-15%, 15-20%, 20-25%, 25-30%, 30-35%, 35-40%, 40-45%, or 45-50%. In some examples, the computer system may assign red to the content having a content marking ratio in a range of 50-55%, 55-60%, 60-65%, 65-70%, 70-75%, 75-80%, 80-85%, 85-90%, 90-95%, or 95-100%. For example, when the computer system delivers the alert as a flag, the flag may be displayed as a yellow flag if the content marking ratio is 5%. The flag may be displayed as a red flag if the content marking ratio is 85%. In some examples, if the parameter exceeds the threshold parameter, the computer determines that the corresponding content is anomalous.

In some examples, the process 900 may further include determining a marking time of the content marking request, the marking time being correlated to the video and the corresponding transcript by the plurality of timestamps. The process 900 may further include receive a request to display the content associated with the content identifier from a third user device associated with a third user. The process 900 may further display, by a user interface of the third user device, an alert of anomalous content to the third user device at the marking time. For example, the computer system may receive from user A's device, a content marking request associated with content (e.g., a video learning module) identified by a content identifier and the computer system determines a marking time of 3:45 (or the time when user A made the marking request). The computer system may later receive from user B's device, a request to display the content associated with the content identifier. The computer system may present, via a user interface at user B's device, the requested content with an alert accompanying the content appearing at the marking time (e.g., timestamp 3:45 of the video) of the content so that user B is notified that the content portion being presented at the marking time may contain anomalous content.

In some examples, the process 900 may further include, by the computer system, compare the parameter to a threshold parameter, determine that the parameter is greater than the threshold parameter, automatically remove, based on the content identifier, the respective content from the content database, and store the removed content in a long-term database different from the content database. In some examples, the computer system may automatically or periodically (at predetermined time intervals) remove the content that are determined to have the parameter that is greater than the threshold parameter. In some examples, the computer system may move and store the removed content to a long-term data storage that is different from the content database. In some examples, the content moved to the long-term data storage may not be regularly accessed by users. In some examples, the long-term data storage be a plurality of geographically distributed content delivery servers.

In some examples, the process 900 may further include, by the computer system, generating a review list based on the parameter and display, at the second user device, the review list. The review list may include a plurality of contents having the parameter meeting at least one criterion. In some examples, the computer system may generate the review list to include contents that have parameters greater than a numerical value. The computer system may display the review list via a user interface at the second user device. In some examples, the computer system may display the review list to the second user device via an email. The computer system may display the contents included in the review list by their content identifiers. The review list may include any information (e.g., the numerical value of each content's parameter, the content marking count of each content included, the content identifier of each content, the content marking ratio of each content, the version of each content, etc.).

In some examples, each content may be associated with a version identifier. The process 900 may further include determining the content marking count based on the content marking request and other content marking requests that include the content identifier and the version identifier.

In some examples, the process 900 further may further include, by the computer system, receiving, from a third user device associated with a third user, a request to interact with the content associated with the content identifier. The computer system may automatically identify a potentially anomalous content or content portion by using a machine learning model. The computer system may further display the potentially anomalous content or content portion at the third user device and a suggested correction of the potentially anomalous content or content portion via a user interface, the user interface including an interactive element. For example, based on previous inputs and marking requests from other users of the content, the computer system may determine that the text content of the learning module on page 4 has a typographical error (e.g., misspelling of "water" as "wattr"). The computer system may, via the user interface as illustrated in FIG. 4, FIG. 5, and FIG. 6, to direct the third user attention (e.g., by prompting notifications, highlighting, adding graphical symbol, etc.) to the sentence containing the misspelling of "wattr," and the user interface may display a suggested correction (e.g., "water") adjacent to "wattr." The user interface may allow the third user to confirm or ignore the suggested correction.

Figure 10:
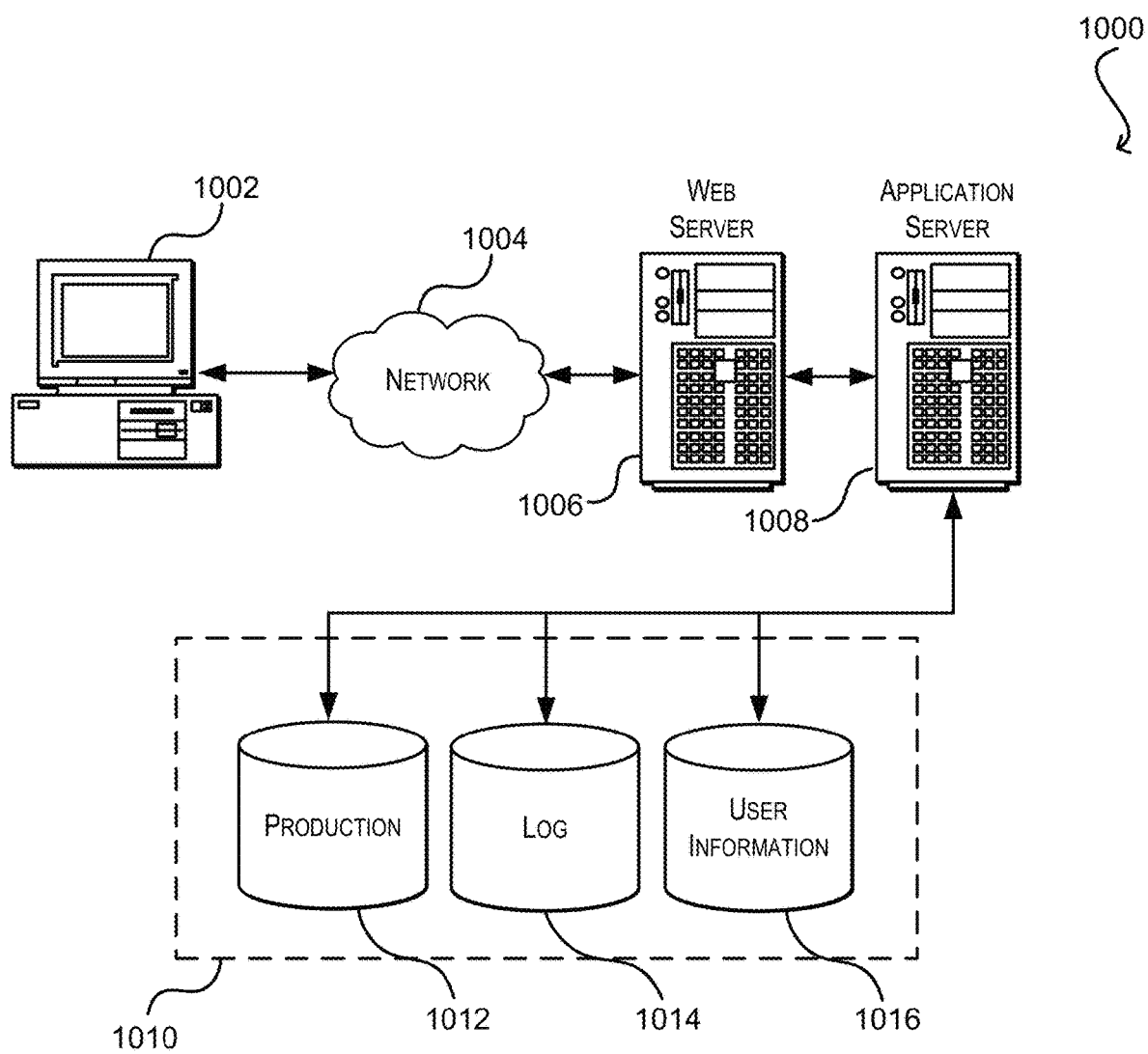
FIG. 10 illustrates aspects of an example environment for implementing aspects of the disclosure, according to various examples.

FIG. 10 illustrates aspects of an example environment for implementing aspects of the disclosure, according to various examples. As will be appreciated, although a Web-based environment is used for purposes of explanation, different environments may be used, as appropriate, to implement various embodiments. The environment 1000 includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

In some examples, cell phones (or, more broadly, mobile phones) may be one specific type of mobile device that is an example of the electronic client device 1002. In some instances, a user mobile device may be considered their primary client device. Other example mobile devices include wearables, such as watches, worn sensors (e.g., rings, bracelets, etc.), cameras, eyeglasses, and the like, which may be considered "connected" auxiliary devices. In some examples, the combination of a user primary mobile device and all or some of their connected, auxiliary devices, may make up a single mobile system configured to communicate with the Web server 1006 or other servers over the network 1004 or other networks.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable media comprising computer-executable instructions that, when executed by one or more processors of a computer system, cause the computer system to perform operations comprising:
   providing content for presentation at a first user device associated with a first user, the content associated with a content identifier;
   receiving, by a computer system and from the first user device, a content marking request, the content marking request including a first user identifier and the content identifier, the content marking request indicating that at least a portion of the content is anomalous;
   determining a content marking count based on the content marking request and other content marking requests that include the content identifier;
   determining a content marking ratio based on the content marking count;
   updating a content record in a content tracking file to include the content marking count and the content marking ratio;
   after updating the content record, determining a parameter indicative of a current state of the content record;
   comparing the parameter to a threshold parameter; and
   delivering an alert of anomalous content at a second user device associated with a second user based on the comparison.

2. The one or more non-transitory computer-readable media of claim 1, wherein the anomalous content comprises content that is outdated, erroneous, or includes inaccurate information, facts, or data.

3. The one or more non-transitory computer-readable media of claim 1, wherein the content marking count is version specific.

4. The one or more non-transitory computer-readable media of claim 1, comprising additional computer-executable instructions that, when executed by the one or more processors, prior to determining a content marking count based on the content marking request and other content marking requests that include the content identifier, cause the computer system to perform additional operations comprising:
   validating the content marking request of the content based on the first user identifier and the content identifier.

5. A computer-implemented method, comprising:
   receiving a content marking request associated with content, the content marking request including a user identifier and a content identifier that identifies the content, the content marking request indicating that at least a portion of the content is anomalous;

determining a content marking count based on the content marking request and other content marking requests that include the content identifier;
determining a content marking ratio based on the content marking count;
updating a content record in a content tracking file to include the content marking count and the content marking ratio; and
determining a parameter indicative of a current state of the content record.

6. The computer-implemented method of claim 5, further comprising, at a predetermined time interval, automatically determining the content marking count based on additional content marking requests and other content marking requests including the content identifier.

7. The computer-implemented method of claim 5, further comprising:
determining that the content is anomalous based on the parameter; and
delivering an alert associated with the anomalous content at a user device associated with a user.

8. The computer-implemented method of claim 5, wherein the content is stored in a content database, the method further comprising:
removing, based on the parameter, the respective content from the content database; and
archiving the removed content to a long-term data storage.

9. The computer-implemented method of claim 5, further comprising:
assigning a color indicator to the content based on the content marking ratio or the parameter, the color indicator including a color code and the content identifier;
receiving a request to display the content from a user device associated with a user; and
displaying, by a user interface of the user device, the content and the assigned color indicator.

10. The computer-implemented method of claim 9, wherein:
a first color code is assigned to the content marking ratio or the parameter in a first value range;
a second color code is assigned to the content marking ratio or the parameter in a second value range; and
a third color code is assigned to the content marking ratio or the parameter in a third value range.

11. The computer-implemented method of claim 5, wherein the content comprises a video and a corresponding transcript, the video and the corresponding transcript being correlated by a plurality of timestamps, the method further comprising:
determining a marking time of the content marking request, the marking time being correlated to the video and the corresponding transcript by the plurality of timestamps.

12. The computer-implemented method of claim 11, further comprising:
receiving a request to display the content from a user device associated with a user; and
displaying, by a user interface and at the user device, an alert of anomalous content to the user device at the marking time.

13. A computer system comprising:
a processor; and
a memory storing computer-readable instructions that, upon execution by the processor, configure the computer system to:

provide content for presentation at a first user device associated with a first user, the content associated with a content identifier;
receive, from the first user device, content marking request that includes a first user identifier and the content identifier, the content marking request indicating that at least a portion of the content is anomalous;
validate the content marking request based on the first user identifier and the content identifier;
determine a content marking count based on the content marking request and other content marking requests that include the content identifier;
determine a content marking ratio based on the content marking count;
update a content record in a content tracking file to include the content marking count and the content marking ratio;
determine a parameter indicative of a current state of the content record;
receive, from a second user device associated with a second user, a request to interact with the content associated with the content identifier; and
display an alert of anomalous content at the second user device.

14. The computer system of claim 13, wherein the content comprises video and transcript, the video and transcript being correlated by a plurality of timestamps, and wherein the memory stores additional computer-readable instructions that, upon further execution by the processor, configure the computer system to:
determine a marking time of the content marking request, the marking time being correlated to the video and the corresponding transcript by the plurality of timestamps;
receive a request to display the content associated with the content identifier from a third user device associated with a third user; and
display, by a user interface of the third user device, an alert of anomalous content to the third user device at the marking time.

15. The computer system of claim 13, wherein the content is stored in a content database, and wherein the memory stores additional computer-readable instructions that, upon further execution by the processor, configure the computer system to:
compare the parameter to a threshold parameter;
determining that the parameter is greater than the threshold parameter;
automatically remove, based on the content identifier, the respective content from the content database; and
store the removed content in a long-term database different from the content database.

16. The computer system of claim 15, wherein the removed content is stored at a plurality of geographically distributed content delivery servers.

17. The computer system of claim 13, wherein the memory stores additional computer-readable instructions that, upon further execution by the processor, configure the computer system to:
generate a review list based on the parameter; and
display, at the second user device, the review list.

18. The computer system of claim 13, wherein the content is associated with a version identifier, and wherein the memory stores additional computer-readable instructions that, upon further execution by the processor, configure the computer system to:

determine the content marking count based on the content marking request and other content marking requests that include the content identifier and the version identifier.

19. The computer system of claim 13, wherein the memory stores additional computer-readable instructions that, upon further execution by the processor, configure the computer system to:
   assign a color indicator to the content based on the content marking ratio or the parameter, the color indicator including a color code and the content identifier; and
   display the content associated with the color indicator, wherein:
      the color code is assigned to be a first color when the content marking ratio is greater than 5%; and
      the color code is assigned to be a second color when the content marking ratio is greater than 50%.

20. The computer system of claim 13, wherein the memory stores additional computer-readable instructions that, upon further execution by the processor, configure the computer system to:
   receive, from a third user device associated with a third user, a request to interact with the content associated with the content identifier;
   automatically identify a potentially anomalous content or content portion by using a machine learning model; and
   displaying the potentially anomalous content or content portion at the third user device and a suggested correction of the potentially anomalous content or content portion via a user interface, the user interface including an interactive element.

* * * * *